US009011658B2

(12) United States Patent
Bryan

(10) Patent No.: US 9,011,658 B2
(45) Date of Patent: *Apr. 21, 2015

(54) SAMPLING PLATE

(75) Inventor: Matthew Robert Bryan, Yorkshire (GB)

(73) Assignee: Jabil Circuit (Singapore) Pte, Ltd., St. Petersburg, FL (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/637,801

(22) PCT Filed: Mar. 30, 2011

(86) PCT No.: PCT/GB2011/050650

§ 371 (c)(1), (2), (4) Date: Sep. 27, 2012

(87) PCT Pub. No.: WO2011/121352

PCT Pub. Date: Oct. 6, 2011

(65) Prior Publication Data

US 2013/0026037 A1 Jan. 31, 2013

(30) Foreign Application Priority Data

Mar. 30, 2010 (GB) .................................. 1005359.3

(51) Int. Cl.
*G01N 27/327* (2006.01)
*B01L 3/00* (2006.01)

(52) U.S. Cl.
CPC ..... *B01L 3/502715* (2013.01); *B01L 3/502723* (2013.01); *B01L 2200/027* (2013.01); *B01L 2200/0605* (2013.01);

(Continued)

(58) Field of Classification Search
CPC ........................ B01L 3/502715; G01N 27/372
USPC ................. 204/403.01–403.15, 415; 422/547
See application file for complete search history.

(56) References Cited

U.S. PATENT DOCUMENTS 4,225,410 A * 9/1980 Pace ............................. 204/412
4,618,475 A 10/1986 Wang (Continued)

FOREIGN PATENT DOCUMENTS

DE 19747875 A1 5/1999
EP 0170375 A2 2/1986

(Continued)

OTHER PUBLICATIONS

He State Intellectual Property Office of the People's Republic of China, The First Office Action for the National Phase of the PCT Application for CN Application No. 200980147833.8 dated Mar. 27, 2013, 16 pages.

(Continued)

*Primary Examiner* — Luan Van
*Assistant Examiner* — Maris R Kessel
(74) *Attorney, Agent, or Firm* — Volpe and Koenig, P.C.

(57) ABSTRACT

The present invention relates to a sampling plate. In particular the invention relates to a sampling plate for measuring certain selected properties of a liquid sample, such as the glucose levels in a blood sample. Sampling plates of the present invention have a sample zone (20) for receiving a liquid sample and an overflow reservoir (26) linked to the sample zone (20) via an overflow channel (26*a*), so that excess blood sample can be redirected away from the sample zone (20) and contained.

9 Claims, 10 Drawing Sheets

(52) U.S. Cl.
CPC . *B01L 2300/0636* (2013.01); *B01L 2300/0822* (2013.01); *B01L 2300/0825* (2013.01); *B01L 2300/0887* (2013.01)

(56) References Cited

U.S. PATENT DOCUMENTS

| | | | |
|---|---|---|---|
| 5,192,415 | A | 3/1993 | Yoshioka et al. |
| 5,264,103 | A | 11/1993 | Yoshioka et al. |
| 5,304,468 | A | 4/1994 | Phillips et al. |
| 5,341,805 | A | 8/1994 | Stavridi et al. |
| 5,352,411 | A | 10/1994 | Khuri |
| 5,391,272 | A | 2/1995 | O'Daly et al. |
| 5,395,504 | A | 3/1995 | Saurer et al. |
| 5,413,690 | A | 5/1995 | Kost et al. |
| 5,413,761 | A | 5/1995 | Dulaney |
| 5,563,042 | A | 10/1996 | Phillips et al. |
| 5,658,444 | A | 8/1997 | Black et al. |
| 5,708,247 | A | 1/1998 | McAleer et al. |
| 5,843,691 | A | 12/1998 | Douglas et al. |
| 5,843,692 | A | 12/1998 | Phillips et al. |
| 5,951,836 | A | 9/1999 | McAleer et al. |
| 5,997,817 | A | 12/1999 | Crismore et al. |
| 6,066,243 | A | 5/2000 | Anderson et al. |
| 6,066,847 | A | 5/2000 | Rosenthal |
| 6,106,780 | A | 8/2000 | Douglas et al. |
| 6,110,522 | A | 8/2000 | Lepper, Jr. et al. |
| 6,241,862 | B1 | 6/2001 | McAleer et al. |
| 6,254,736 | B1 | 7/2001 | Earl et al. |
| 6,268,162 | B1 | 7/2001 | Phillips et al. |
| 6,270,637 | B1 | 8/2001 | Crismore et al. |
| 6,475,372 | B1 | 11/2002 | Ohara et al. |
| 6,503,701 | B1 | 1/2003 | Bauer |
| 6,525,330 | B2 | 2/2003 | Paolini et al. |
| 6,541,216 | B1 | 4/2003 | Wilsey et al. |
| 6,558,528 | B1 | 5/2003 | Matzinger |
| 6,562,210 | B1 | 5/2003 | Bhullar et al. |
| 6,562,625 | B2 | 5/2003 | Modzelewski et al. |
| 6,592,815 | B1 | 7/2003 | Zimmer |
| 6,603,987 | B2 | 8/2003 | Whitson |
| 6,612,111 | B1 | 9/2003 | Hodges et al. |
| 6,662,439 | B1 | 12/2003 | Bhullar |
| 6,676,995 | B2 | 1/2004 | Dick et al. |
| 6,689,265 | B2 | 2/2004 | Heller et al. |
| 6,723,500 | B2 | 4/2004 | Yu |
| 6,730,200 | B1 | 5/2004 | Stewart et al. |
| 6,743,635 | B2 | 6/2004 | Neel et al. |
| 6,746,960 | B2 | 6/2004 | Goodman |
| 6,764,581 | B1 | 7/2004 | Forrow et al. |
| 6,821,400 | B2 | 11/2004 | Jaeger |
| 6,863,800 | B2 | 3/2005 | Karinka et al. |
| 7,118,667 | B2 | 10/2006 | Lee |
| 2002/0006355 | A1 | 1/2002 | Whitson |
| 2002/0084196 | A1 | 7/2002 | Liamos et al. |
| 2002/0100685 | A1 | 8/2002 | Huang et al. |
| 2002/0125145 | A1 | 9/2002 | Ohara et al. |
| 2002/0168290 | A1 | 11/2002 | Yuzhakov et al. |
| 2002/0177788 | A1 | 11/2002 | Hodges et al. |
| 2003/0028087 | A1 | 2/2003 | Yuzhakov et al. |
| 2003/0028125 | A1 | 2/2003 | Yuzhakov et al. |
| 2003/0036202 | A1 | 2/2003 | Teodorcyzk et al. |
| 2003/0042150 | A1 | 3/2003 | Ryu et al. |
| 2003/0068666 | A1 | 4/2003 | Zweig |
| 2003/0094383 | A1 | 5/2003 | Kermani |
| 2003/0096424 | A1 | 5/2003 | Mao et al. |
| 2003/0099773 | A1 | 5/2003 | Dick et al. |
| 2003/0104510 | A1 | 6/2003 | Yu |
| 2003/0106809 | A1 | 6/2003 | Kermani et al. |
| 2003/0133847 | A1 | 7/2003 | Hagen et al. |
| 2003/0185705 | A1 | 10/2003 | Otake |
| 2003/0185708 | A1 | 10/2003 | Otake |
| 2003/0186446 | A1 | 10/2003 | Pugh |
| 2003/0200644 | A1 | 10/2003 | Matzinger |
| 2003/0212344 | A1 | 11/2003 | Yuzhakov et al. |
| 2003/0212346 | A1 | 11/2003 | Yuzhakov et al. |
| 2003/0212347 | A1 | 11/2003 | Sohrab |
| 2003/0223906 | A1 | 12/2003 | McAllister et al. |
| 2003/0224203 | A1 | 12/2003 | Raychaudhuri et al. |
| 2004/0026243 | A1 | 2/2004 | Davies et al. |
| 2004/0038411 | A1 | 2/2004 | Hayter et al. |
| 2004/0096927 | A1 | 5/2004 | Chittock et al. |
| 2004/0137141 | A1 | 7/2004 | Dick et al. |
| 2004/0157275 | A1 | 8/2004 | Marfurt |
| 2004/0186394 | A1 | 9/2004 | Roe et al. |
| 2004/0214345 | A1 | 10/2004 | Matzinger et al. |
| 2004/0217016 | A1 | 11/2004 | Khan |
| 2004/0236250 | A1 | 11/2004 | Hodges et al. |
| 2004/0251132 | A1 | 12/2004 | Leach et al. |
| 2004/0256248 | A1 | 12/2004 | Burke et al. |
| 2004/0259180 | A1 | 12/2004 | Burke et al. |
| 2004/0260511 | A1 | 12/2004 | Burke et al. |
| 2004/0265171 | A1 | 12/2004 | Pugia et al. |
| 2004/0265172 | A1 | 12/2004 | Pugia et al. |
| 2005/0004494 | A1 | 1/2005 | Perez et al. |
| 2005/0008537 | A1 | 1/2005 | Mosoiu et al. |
| 2005/0013731 | A1 | 1/2005 | Burke et al. |
| 2005/0016844 | A1 | 1/2005 | Burke et al. |
| 2005/0019212 | A1 | 1/2005 | Bhullar et al. |
| 2005/0023136 | A1 | 2/2005 | Leach et al. |
| 2005/0023137 | A1 | 2/2005 | Bhullar et al. |
| 2005/0023152 | A1 | 2/2005 | Surridge et al. |
| 2005/0023154 | A1 | 2/2005 | Kermani et al. |
| 2005/0069892 | A1 | 3/2005 | Iyengar et al. |
| 2005/0098433 | A1 | 5/2005 | Gundel |
| 2005/0103624 | A1 | 5/2005 | Bhullar et al. |
| 2005/0109618 | A1 | 5/2005 | Davies |
| 2005/0109637 | A1 | 5/2005 | Iyengar et al. |
| 2005/0113717 | A1 | 5/2005 | Matzinger et al. |
| 2005/0114062 | A1 | 5/2005 | Davies et al. |
| 2005/0118062 | A1 | 6/2005 | Otake |
| 2005/0133368 | A1 | 6/2005 | Davies et al. |
| 2005/0136501 | A1 | 6/2005 | Kuriger |
| 2005/0196747 | A1 | 9/2005 | Stiene |
| 2006/0078986 | A1 | 4/2006 | Ly et al. |
| 2006/0226985 | A1 | 10/2006 | Goodnow et al. |
| 2006/0243591 | A1 | 11/2006 | Plotkin et al. |
| 2006/0246214 | A1 | 11/2006 | Plotkin et al. |
| 2006/0260940 | A1 | 11/2006 | McAleer et al. |
| 2007/0281321 | A1 | 12/2007 | Nagale et al. |
| 2008/0073207 | A1 | 3/2008 | Teodorczyk et al. |
| 2008/0297169 | A1 | 12/2008 | Greenquist et al. |
| 2009/0130719 | A1 | 5/2009 | Handique |
| 2010/0089775 | A1 | 4/2010 | Chen et al. |
| 2010/0219084 | A1 | 9/2010 | Blythe et al. |
| 2011/0168575 | A1 | 7/2011 | Lica et al. |
| 2011/0241694 | A1 | 10/2011 | Burke et al. |
| 2012/0011705 | A1 | 1/2012 | DeNuzzio et al. |
| 2013/0020198 | A1 | 1/2013 | Bryan |

FOREIGN PATENT DOCUMENTS

| | | | |
|---|---|---|---|
| EP | 0787984 | A1 | 8/1997 |
| EP | 1111378 | A2 | 6/2001 |
| EP | 1304570 | A1 | 4/2003 |
| EP | 1357194 | A2 | 4/2003 |
| EP | 1421899 | A1 | 5/2004 |
| EP | 1422523 | A1 | 5/2004 |
| EP | 1723412 | A2 | 11/2006 |
| EP | 1764030 | A1 | 3/2007 |
| GB | 2463914 | A2 | 3/2010 |
| GB | 2465842 | A | 9/2010 |
| JP | 06288964 | | 10/1994 |
| WO | 9946045 | A1 | 9/1999 |
| WO | 0175433 | A2 | 10/2001 |
| WO | 03094713 | A1 | 11/2003 |
| WO | 2005047877 | A1 | 5/2005 |
| WO | 2005079664 | A1 | 9/2005 |
| WO | 2006015615 | A1 | 2/2006 |
| WO | 2006116616 | A2 | 11/2006 |
| WO | 2007076940 | A1 | 7/2007 |
| WO | 2008029110 | A2 | 3/2008 |
| WO | 2008134587 | A1 | 11/2008 |
| WO | 2011121352 | A1 | 10/2011 |
| WO | 2011124906 | A1 | 10/2011 |

(56) References Cited

OTHER PUBLICATIONS

Patent Cooperation Treaty, International Search Report for Application No. PCT/GB2011/050650 dated Jul. 6, 2011, 3 pages.
Landre, International Application No. PCT/GB2011/050654, International Search Report, Jul. 18, 2011, 3 pages.
Nickitas-Etienne, International Application No. PCT/GB2011/050654, International Preliminary Report on Patentability, Oct. 2, 2012, 5 pages.
Tucker, Application No. GB0817842.8, Search Report under Section 17, Dec. 15, 2008, 2 pages.
Pidgeon, Application No. GB0817842.8, Response to Examination Letter, Mar. 21, 2012, 26 pages.
Cole, Application No. GB 1205054.8, Combined Search and Examination Report under Sections 17 & 18(3), dated Apr. 19, 2012, 4 pages.
Cole, Application No. GB 1205054.8, Search Report under Section 17, dated Apr. 18, 2012, 2 pages.
Patent Cooperation Treaty, PCT International Search Report and Written Opinion of the International Searching Authority for Application No. PCT/GB2009/051225 dated Jan. 1, 2010, 8 pages.
Kessel, U.S. Appl. No. 13/121,509, Office Action Communication, Sep. 25, 2012, 13 pages.
Kessel, Office Action Communication for U.S. Appl. No. 13/121,509 date May 22, 2013, 25 pages.
Ball, Office Action Communication for U.S. Appl. No. 13/637,813 dated Dec. 18, 2013, 31 pages.

* cited by examiner

SAMPLING PLATE

INTRODUCTION

The present invention relates to a sampling plate. In particular the invention relates to a sampling plate for measuring certain selected properties of a liquid sample, such as the glucose levels in a blood sample.

INTRODUCTION TO THE BACKGROUND ART

There is a widespread need for sampling plates such as those which, when used in conjunction with a measurement device, enable a diabetes patient to know their blood sugar levels—i.e. the concentration of glucose in their blood.

Traditional sampling plates function by receiving a spotted blood sample and directing at least some of the blood to a testing zone. The testing zone typically takes the form of a recess or well containing a quantity of glucose oxidase which chemically reacts with the blood to an extent and at a rate determined by the glucose concentration in the blood. The testing zone is typically furnished with a pair of electrode terminals which are conveniently bridged by the reaction mixture of the blood and glucose oxidase so as to allow for electrochemical readings by a corresponding measurement device. The electrochemical readings then provide an indication of blood glucose levels.

A problem with such traditional sampling plates is that they are often unreliable when overfilled, meaning that care is needed when applying blood samples to the sampling plate. This can be inconvenient for less dextrous individuals. Another problem is that traditional sampling plates often give poor distribution of blood samples, often providing testing zones with an inconsistent measure of blood. Another problem with traditional sampling plates is that a blood sample in one testing zone is linked along a fluid path to a blood sample in another testing zone, which gives rise to inaccurate measurements, particularly in electrochemical systems. Another problem is that blood spreading in and to the testing zone is often slow and/or non-uniform. For instance, blood spreading is often biased in the direction of an initial blood flow courtesy of surface tension. Sometimes a blood sample will not spread throughout the testing zone, and consequently measurements may be inaccurate or unreliable.

It is an object of the present invention to provide an improved sampling plate.

SUMMARY OF THE INVENTION

According to a first aspect of the present invention there is provided a sampling plate, comprising:

a sample zone for receiving a liquid sample; and an overflow reservoir linked to the sample zone via an overflow channel.

An advantage of the present invention is that the sampling plate is more tolerant to overfilling with the liquid sample, which means that less care is needed when applying liquid samples to the sampling plate. Excess liquid sample is simply directed via the overflow channel to the overflow reservoir, so that the liquid sample does not overfill the sample zone. Another advantage is that the presence of an overflow reservoir regulates the measure of liquid sample in the sample zone. As a result, more accurate measurements in relation to the liquid sample are possible. Another advantage is that the presence of an overflow reservoir can assist distribution of the liquid sample because the overflow channel and reservoir effectively provides an air vent allowing displacement of air from the sample zone as the liquid sample enters thereinto. As such, air locks/bubbles are avoided, and the liquid sample can spread more easily and uniformly. Again more accurate measurements in relation to the liquid sample may thereby be obtained.

The sampling plate preferably comprises a loading port for loading the liquid sample. The sampling plate preferably comprises a loading path between the loading port and sample zone along which the liquid sample can travel towards the sample zone. The overflow channel preferably redirects the excess liquid sample away from the sample zone. The overflow reservoir is preferably located beyond the sample zone and loading path.

The sample zone may comprise one or more testing zones.

The overflow reservoir is preferably auxiliary to the testing zones (i.e. the overflow reservoir is not a testing zone). This separation of function ensures that filling of testing zones can be regulated separate to the overflow reservoir, thereby allowing for more consistent and accurate measurements from the testing zones.

The overflow reservoir preferably has a volume capacity exceeding the volume capacity of a single testing zone. Preferably the overflow reservoir has a volume capacity exceeding the total volume capacity of all the testing zones of the sample zone. Preferably the overflow reservoir is able to contain a greater volume of the liquid sample than all of the testing zone(s) combined. A relatively large volume capacity for the overflow reservoir allows for better regulated filling of the testing zones themselves.

The sample zone preferably comprises at least two discrete testing zones. By "discrete" it is meant that samples are fully separated from each other. In particular, they are not linked together by a portion of the liquid sample which may, for instance, otherwise remain on a fluid path between the at least two discrete samples. Discrete samples, rather than samples which overlap, allows for greater accuracy in measurements. In this case, the overflow reservoir plays an important part in ensuring the samples in the testing zones remain discrete and do not reconnect along a fluid path.

Preferably the overflow channel is discrete from the at least two discrete testing zones. In other words, any liquid sample contained in the testing zones is kept separate from any liquid sample in the overflow channel. The overflow channel is preferably separated from the at least two discrete testing zones by a hydrophobic boundary. Preferably the sample zone is arranged so that once a part of the liquid sample has entered a given testing zone, that part of the liquid sample cannot escape the given testing zone into the overflow reservoir, and preferably cannot escape the given testing zone at all.

The sample zone preferably comprises a distribution centre arranged to distribute the liquid sample to the testing zone(s). Preferably the distribution centre is arranged to receive the liquid sample as it is loaded to the sampling plate, preferably via a loading port. Preferably the overflow channel is linked to the distribution centre to enable the liquid sample to flow from the distribution centre into the overflow reservoir. The distribution centre may be a loading platform, preferably a hydrophobic loading platform. The hydrophobic boundary separating the at least two discrete testing zones from the overflow channel may comprise the distribution centre. It is preferable to have the overflow channel linked to the distribution centre rather than a testing zone so that all of the testing zones are discrete and can be volumetrically controlled in terms of their liquid sample content.

The overflow reservoir is preferably a well, or open space for containing the excess liquid sample. Alternatively, however, the overflow reservoir may be a sponge or other porous reservoir arranged to soak up liquid sample. A well is preferred because it allows more effectively regulation of distribution of the excess liquid sample.

The overflow channel is preferably arranged to restrict flow of the liquid sample into the overflow reservoir to a greater extent than flow is restricted into the testing zone(s). This prevents underfilling of the sample zone and testing zones. This greater restriction ensures that the sample zone or testing zones are filled before the overflow reservoir.

The overflow channel is preferably narrower than a, or each, respective entrance to the testing zone(s). Again this ensures that underfilling of testing zones does not occur and that the liquid sample fills the testing zones before the overflow reservoir. Preferably the overflow channel is 20 to 90% narrower than the respective entrance to the testing zone(s), more preferably 50 to 85% narrower, most preferably 70 to 80% narrower. If the overflow channel is too narrow, the sample zone can become overfilled to the extent that the testing zone(s) are no longer discrete. If the overflow channel is too wide, the overflow reservoir will start to fill before the testing zone(s) are full. The width of the respective entrance to the testing zone(s) is preferably 0.5 to 2 mm, more preferably 0.75 to 1.5 mm, most preferably 0.8 to 1.2 mm.

The overflow channel preferably widens towards the overflow reservoir. The overflow channel preferably flows directly into the overflow reservoir. The overflow reservoir may in fact comprise the overflow channel. The interface between the overflow channel and overflow reservoir may be defined, but preferably there is no defined interface (i.e. the channel becomes the overflow region). As such, the overflow reservoir may widen from the overflow channel. Preferably the overflow reservoir widens significantly from the channel. This helps draw excess liquid sample into the reservoir rapidly so as to prevent the sample zone from becoming overloaded. Preferably the overflow reservoir widens to between 3 and 30 times the width of the overflow channel, more preferably between 5 and 20 times, most preferably between 10 and 15 times. Preferably the overflow reservoir is a tear drop-shaped.

The sampling plate preferably comprises an air porous body which is in fluid communication with the sample zone. This provides for better and more uniform spreading of the liquid sample in the sample zone.

The sampling plate preferably comprises an air porous body which is in fluid communication with the overflow reservoir. This provides for better and more uniform spreading of the liquid sample in the sample zone and overflow reservoir.

Herein, a "sampling plate" may mean any surface capable of receiving a liquid sample in a sample zone. Preferably, however, the sampling plate is portable. Suitably the sampling plate may cover an area less than 1 $m^2$, preferably less than 50 $cm^2$, more preferably less than 10 $cm^2$ and most preferably less than 5 $cm^2$. The sampling plate may cover an area less than 500 $mm^2$—for instance 350 $mm^2$ where the sampling plate is 10 mm wide by 35 mm long. Suitably the sampling plate may be rectangular. The sampling plate may be a strip, and may be a flexible strip. Preferably, however, the sampling plate is an individual plate, preferably a rigid sampling plate. The thickness of the sampling plate is preferably less than 1 cm, preferably less than 1 mm, more preferably less than 0.5 mm, most preferably less than 0.25 mm.

The sampling plate is preferably compatible with a measurement device. For example, the measurement device is preferably operable to communicate with the sampling plate to measure one or more selected properties of any of the at least two samples. Preferably the sampling plate may be inserted into the measurement device to allow measurements to be taken. The measurement device is preferably in accordance with that described in co-pending application PCT/GB2009/051225 filed on 21 Sep. 2009 by the present applicants. This co-pending application is hereby incorporated by reference.

"In fluid communication with" may mean interfacing, where "interfacing" means sharing a common boundary. Preferably "in fluid communication with" refers to where the air porous body is adjacent to the sample zone and/or the overflow reservoir. The air porous body may define a floor of the sample zone and/or wall(s) of the sample zone. The air porous body may surround the sample zone and/or the overflow reservoir. Preferably the air porous body defines the sample zone and/or the overflow reservoir, or defines an outer boundary of the sample zone and/or the overflow reservoir. Preferably the air porous body defines the perimeter of the sample zone and/or the overflow reservoir or at least part of the perimeter of the sample zone and/or the overflow reservoir. Preferably the air porous body is external to the sample zone and/or the overflow reservoir itself. Preferably the sample zone is free of air porous body.

Preferably the air porous body is arranged to receive displaced air as the liquid sample approaches the air porous body. Preferably the air porous body is arranged to receive air displaced in the same direction as the liquid sample travels (or spreads) into the sample zone and/or the overflow reservoir. Preferably the air porous body is arranged to receive a side-ways displacement of air as the liquid sample approaches the air porous body in a side-ways manner. Preferably the sample zone is arranged to prevent back flow of the liquid sample.

An advantage of the air porous body is that it helps the liquid sample to flow into the sample zone and/or the overflow reservoir with minimal air resistance, by providing a means by which air can be directly displaced—preferably in the same direction as the liquid sample enters the sample zone and/or the overflow reservoir. This permits the liquid sample to enter the sample zone and/or the overflow reservoir at a faster rate. In contrast, where such an air porous body is absent, air resistance retards the flow of the liquid sample into the sample zone and/or the overflow reservoir.

Another advantage is that the air porous body helps the liquid sample to spread uniformly throughout the sample zone, thus giving greater sampling consistency and consequently more accurate measurements. In contrast, where the air porous body is absent, air resistance affects the fluid dynamics of the liquid sample by discouraging spreading (air resistance from all sides) and instead encouraging the liquid sample to remain collectively associated as a bulk (aided by surface tension). As such the liquid sample tends to flow as a bulk in a single direction since in this way the bulk overcomes air resistance in that particular direction.

Another advantage is that formation of air-pockets is alleviated, which again allows for better spreading and more accurate measurements.

The liquid sample is preferably hydrophilic, more preferably aqueous-based, and most preferably blood. In this case, blood glucose levels of a diabetic patient may be measured.

The air porous body is preferably substantially impermeable to the liquid sample. The air porous body is preferably substantially impermeable to water. The air porous body is preferably substantially impermeable to an aqueous liquid sample, and most preferably substantially impermeable to blood.

The air porous body is preferably impermeable to water (at standard temperature and pressure) to the extent that the air porous body remains visibly wet for at least 15 seconds, preferably at least 30 seconds, more preferably at least 1 minute, most preferably at least 10 minutes, after wetting a portion of the air porous body with the smallest drop of water required to impart visible wetness.

The air porous body is preferably suitable for containing 100% of the liquid sample for at least 15 seconds, more preferably for at least 1 minute, and most preferably at least 10 minutes. The air porous body is preferably totally impermeable to the liquid sample, water, an aqueous liquid sample, or a blood sample. Such impermeability is preferably imparted by the hydrophobicity of the air porous body rather than the small size of its pores. Most preferably the air porous body is arranged to contain the liquid sample in the sample zone. Preferably the air porous body is arranged to hold the liquid sample, preferably an aqueous liquid sample, and more preferably blood, within the sample zone.

Preferably the perimeter of the sample zone comprises a wall. Preferably the perimeter (or wall) of the sample comprises at least some air porous body. Preferably at least 50% of the perimeter comprises air porous body, preferably at least 70%, more preferably at least 90%, and most preferably at least 95% of the perimeter comprises air porous body. Preferably the perimeter comprises substantially 100% air porous body. The air porous body is preferably located substantially around the perimeter of the sample zone. Preferably a floor of the sample zone is free of air porous body. Preferably the sample zone is free of a roof. Where the sample zone comprises a roof, the roof is preferably free of air porous body.

The air porous body preferably comprises hydrophobic material. Preferably the air porous body comprises at least 50 wt %, more preferably at least 70 wt %, and most preferably at least 90 wt % hydrophobic material. In some embodiments the air porous body may comprise a mixture of hydrophobic and hydrophilic material. Preferably the air porous body is hydrophobic overall (i.e. has a net hydrophobicity). Hydrophobicity may be measured by considering techniques well known in the art. In general, the air porous body exhibits the requisite net hydrophobicity where a drop of water rolls off the surface of the air porous body when such a surface is inclined at least 30° from horizontal, preferably at least 20° from horizontal, and most preferably at least 10° from horizontal.

The porosity of a porous material generally describes a fraction of void space (capable of containing fluids) in the porous material, and may be expressed as:

$$\phi = V_v/V_T;$$

where $V_v$ is the volume of void space, and $V_T$ is the total volume of material including void space. There are a number of ways of measuring porosity, including:

- Direct Methods—determining the bulk volume of the porous material and then determining the volume of skeletal material with no pores (pore volume=total volume−skeletal material volume);
- Optical Methods—determining the area of the material versus the area of the pores visible under a microscope. This method is accurate for materials with random structure since areal porosity and volumetric porosity is then the same.
- Imbibition Methods—immersing the porous material, under vacuum, in a fluid the preferentially wets the pores. In this case a non-hydrophilic fluid would be preferred which does not dissolve the air porous body. Those skilled in the art would readily select a suitable solvent. (pore volume=total volume of fluid−volume of fluid left after soaking).
- Fluid Evaporation Method (pore volume is a function of: weight of a porous material saturated with fluid−weight of dried air porous body).

Many other methods are also known in the art.

The air porous body preferably has a porosity of at least 0.001, preferably at least 0.01, more preferably at least 0.1, and most preferably at least 0.2. The air porous body preferably has a porosity of at most 0.95, preferably at most 0.90, more preferably at most 0.8, and most preferably at most 0.7. The most preferable porosity is between 0.3 and 0.4. A porosity lower than the preferred minimum impedes air displacement. A porosity above the preferred maximum risks the air porous body becoming moderately permeable to the liquid sample, particularly water or blood.

The air porous body preferably has an average pore size between 10 and 300 microns, preferably between 50 and 200 microns, and most preferably between 100 and 150 microns.

Pores of the air porous body are preferably free from blockage by a pore blocking substance. For instance, the pore blocking substance may include an adhesive, especially an adhesive for adhering the air porous body to the sampling plate. The air porous body must, of course, be porous when incorporated into the sampling plate. The extent of pore blocking is the extent to which the void space of the air porous body (i.e. the space of the pores) is occupied by the pore blocking material, as measurable in accordance with the above techniques or others well known in the art. Preferably the pores of the air porous body are less than 70% blocked, preferably less than 50% blocked, more preferably less than 30% blocked, and most preferably less than 10% blocked.

The air porous body preferably comprises an air porous mesh, which again is preferably hydrophobic overall. Such an air porous mesh preferably comprises polyether ether ketone (PEEK), polypropylene (PP), polyester (PET), polyvinylidene fluoride (PVDF), ethylene chlorotrifluoroethylene (ECTFE), ethylene co-tetrafluoroethylene (ETFE), nylon (polyamide), or fluorinated ethylene-propylene (FEP). The air porous mesh preferably comprises polyester (PET). Most preferably the air porous mesh comprises Sefar 07-120 34. Such materials are the most suitable for being adhered to a sampling plate whilst minimising pore blockage which would otherwise undesirably reduce air porosity.

The thread diameter of the mesh is preferably between 10 and 300 microns, more preferably between 50 and 200 microns, and most preferably between 70 and 100 microns.

The air porous body is preferably a porous layer of the sampling plate. The porous layer preferably has a thickness of between 0.01 mm and 3 mm, more preferably between 0.1 mm and 1 mm, most preferably 0.1 mm to 0.2 mm. The porous layer is preferably adhered to the sampling plate, preferably by an adhesive. Preferably the adhesive comprises synthetic rubber adhesive. The adhesive preferably covers 1 to 20 $g/m^2$, more preferably 5 to 15 $g/m^2$, most preferably 10 $g/m^2$ of the surface of the porous layer. The adhesive may be comprised of double-sided adhesive tape, wherein the preferred coverage of adhesive as stated above refers to adhesive lying between the adhesive tape and the porous layer. This ensures that pore blockage of the air porous body is kept to a minimum, especially when the adhesive is used in combination with one of the preferred air porous mesh materials. The porous layer preferably comprises an empty portion (or hole) arranged to receive and contain the liquid sample. The outer limits of the empty portion preferably defines the perimeter of the sample zone and/or the overflow reservoir.

The sample zone preferably comprises a testing zone, possibly only a single testing zone. Preferably, however, the sample zone comprises at least two discrete testing zones.

The presence of the air porous body is particularly advantageous where there is more than one testing zone since such technology allows the liquid sample to spread into each testing zone, rather than tending to fall towards just one. The sample zone is preferably arranged, in use, to separate the liquid sample into at least two discrete samples, where preferably each discrete sample occupies a respective testing zone. By "discrete" it is meant that samples are fully separated from each other. In particular, they are not linked together by a portion of the liquid sample which may, for instance, otherwise remain on a fluid path between the at least two discrete samples. Discrete samples, rather than samples which overlap, allows for greater accuracy in measurements. The invention also has the advantage that each of the at least two discrete samples is exposed to only one testing zone, thereby avoiding contamination or interference by another testing zone, which may otherwise lead to inaccurate measurements. By "to separate the liquid sample into at least two discrete samples" it is meant that the sample zone actively separates the liquid sample into and maintains separation of the discrete samples.

The sampling plate is preferably operable to communicate with a measurement device such that one or more selected properties of any of the at least two discrete samples is measurable. The invention allows multiple measurements to be taken in respect of a plurality of discrete samples. For example, one sample may be used to determine one selected property (e.g. physiological condition); another sample may be used to determine another selected property. The measurements may pertain to the same property or different properties, thus allowing for detailed analysis of a liquid sample, such as a patient's blood, using a single sampling plate.

Preferably the sampling plate is operable to take an electrochemical measurement in respect of each sample. The sample zone may have three or more testing zones, preferably from three to five testing zones, most preferably four testing zones. The presence of multiple testing zones and samples allows for determination and/or quantification of different metabolites, assessment of different physiological conditions, averaging of measurement results, and validation of measurement results.

The sample zone may comprise a separation means for separating the liquid sample into at least two discrete samples, such that each sample occupies a respective testing zone. For instance, the separation means may comprise a hydrophobic zone or boundary (hereinafter hydrophobic boundary) which, in use, lies between the at least two testing zones. A preferred hydrophobic material is flexographic ink, preferably doped with at least one component which increases hydrophobicity, e.g. a detergent. Most preferably the hydrophobic material comprises a hydrophobic acrylic resin, a silicone antifoaming agent, micronized wax, and fumed silica (as a filler). This is advantageous as the hydrophobic boundary separates samples, and/or assists in the separation of the liquid sample into two or more discrete samples. The separation means may comprise a primary hydrophobic zone located towards the centre of the sample zone or towards a central region lying between all the respective testing zones. The primary hydrophobic zone may be arranged to first receive the liquid sample before distributing the liquid sample amongst the respective testing zones. The primary hydrophobic region may be a raised portion of the sample zone (i.e. located at a different depth within the sampling plate than a floor of each respective testing zone), preferably allowing the liquid sample to fall towards and into the respective testing zones by virtue of gravity (for instance, when the sampling plate is held with the sample zone facing upwards). Preferably hydrophobic boundaries emanate from the primary hydrophobic zone, and preferably define divisions between each testing zone.

The sample zone may comprise a hydrophilic floor or floors for containing the liquid sample. Each of the at least two testing zones preferably comprises a hydrophilic portion, which is arranged to receive one of the at least two discrete samples. A preferred hydrophilic material is flexographic ink, preferably doped with at least one component which increases hydrophilicity. The hydrophilic material preferably comprises a water-based acrylic polymer and a surfactant (preferably either TWEEN 20 or TWEEN 80). Surface tension tends to keep each sample in its own testing zone.

Each testing zone preferably comprises a well, where each well is arranged to receive one of the at least two discrete samples. The well may be circular or non-circular (that is at the mouth), and possibly substantially square shaped (i.e. at the mouth). Preferably the well has sides where the sides are substantially sloped. Preferably the sides connect to a base of the well and to a top sheet (in which the well is formed) in a smooth or continuous manner, without any discontinuities. The well may have a surface area of between 2.5 and 4 $mm^2$ and a depth of 200-300 μm. Each well may comprise the abovementioned hydrophilic portion. A well helps to keep the samples discrete, and also provides a three dimensional target for dosing inks thereinto (see below). This improves the manufacturing process.

The wells are preferably rounded, and preferably circular (that is at the mouth). Preferably the wells are free of corners, preferably free of sharp corners. Preferably the wells comprise a continuous surface, preferably a curved surface. Most preferably the wells are dimples, preferably hemispherical dimples. The hemispherical wells may have a depth between 100 μm and 200 μm.

All the testing zones may, in use, be employed for providing measurements of a sample contained therein. However, one or more of the at least two testing zones may serve an alternative purpose, such as to collect excess liquid sample to avoid the other testing zones from becoming overfilled.

The sample zone may therefore help separate the liquid substance into discrete samples by virtue of its shape. This may include paths. This may also include troughs, recesses, etc., herein broadly referred to as wells. The sample zone may also help separate the liquid substance by virtue of chemical means. For instance, the sample zone may comprise certain hydrophobic region(s) and/or hydrophobic region(s). Preferably the sample zone helps to separate the liquid substance into discrete samples by virtue of both its shape and the chemical means.

At least one testing zone preferably comprises a laid-down material, which in the medical testing field is conventionally called an "ink" (this term is used hereinafter). The ink may have a pigment, but not necessarily. Preferably the ink comprises a test material, so as to be an "active" ink. Preferably the test material is selected to be chemically reactive with at least one component of the liquid sample. This reactivity may provide the basis for measurements of a selected property of the liquid substance. The test material is preferably bound to the testing zone, so as not to flow during normal handling of the sampling plate. The test material is preferably dried on to the testing zone, and may be a dried coating, gel or paste. Preferably it is formed from a liquid precursor, preferably a solution of the test material. The test material within the ink is preferably selected to be chemically reactive with glucose. However, the test material may also be selected to be reactive with another component of the liquid sample, such as ketones.

The test material preferably comprises an enzyme, preferably either glucose oxidase or glucose dehydrogenase.

Preferably more than one of at least two testing zones comprises an ink. Each ink may be different or comprise a different test material. Each different ink may react with the same component, so as to provide measurements which are self-calibrating. Alternatively each different ink may react with a different component of the liquid sample, enabling measurement of a plurality of selected properties. Measurement of a plurality of selected properties allows assessment and/or monitoring of a plurality of different illnesses, conditions, and/or medical states (analyte levels/concentration). It also allows assessment or monitoring of such as recreational drug use, or alcohol abuse. In particular it allows assessment of the use of a plurality of recreational drugs simultaneously.

Preferably at least one testing zone comprises a "mediator" ink. The mediator ink is conductive when in solution or mixed with a liquid sample such as blood. This increases the sensitivity of the measurements. The same at least one testing zone preferably further comprises either an active ink or a passive ink. The active ink comprises a test material, whereas the passive ink is the same as the active ink but without the test material. The mediator ink and active or passive ink may be substantially mixed with each other, rather than being layered. This can be achieved by pre-mixing the inks before laying them down in the at least one testing zone.

The sampling plate preferably comprises at least one pair of electrodes arranged to permit an electrochemical measurement to be taken in respect of the liquid sample. The sampling plate preferably comprises at least one pair of electrodes connectable to electrical terminals within the measurement device. A pair of electrodes generally consists of an anode/cathode pair. Preferably at least one and preferably each testing zone (or well) contains a pair of electrodes. The at least one pair of electrodes is preferably bridged, in use, by the liquid sample in a testing zone. In use, that testing zone preferable contains an electrolyte, where the electrolyte is preferably one of the at least two discrete samples, and is more preferably the reaction product of one of the at least two samples with an ink. The measurement device may suitably communicate with the sampling plate by applying a potential difference across the at least one pair of electrodes. Such communication preferably provides measurements in respect of the electrolyte to determine certain one or more selected properties of the liquid sample. Such an electrochemical measurement technique is typically more accurate than other sample measurement techniques available in the field, such as optical measurements. Preferably, after loading the liquid sample, the system requires a period of time, preferably from 3 to 15 seconds, before the result is made available.

A pair of electrodes per testing zone does not exclude an embodiment where all or some testing zones have a single common electrode, whether a cathode or an anode. Such a common electrode has a plurality of termini (electrolyte contacts) adjacent to or in each testing zone. In this case each testing zone associated with the common electrode preferably has its own individual opposite electrode, whether an anode or cathode. In fact, a single common electrode arrangement is preferred owing to ease of manufacture of both the sampling plate and the corresponding measurement device.

The electrodes are preferably printed, most preferably flexographically printed electrodes. The printed electrodes preferably comprise an ink. Said ink preferably comprises conductive particulates such as carbon and/or graphite. The ink may be printed to a specific design.

Preferably each testing zone is electrically isolated. Preferably a space between the electrodes comprises insulating material, preferably printed insulation material, most preferably flexographically printed insulation material. This helps prevent signal interference between electrodes. The insulation material preferably comprises an ink that is free of conductive particulates or conductive ingredients, and is preferably printed to a specific design that electrically isolates the conductive electrodes from each other.

The electrolyte is preferably producible by a chemical reaction between at least one component of the liquid sample and the ink. Selected properties may be measurable from an electric current measurement. A constant potential difference, preferably between 100 and 1000 millivolts (mV), through the at least one pair of electrodes and across a corresponding testing zone may give rise to an electric current, which current is dependent on the selected property, e.g. glucose concentration. In some embodiments it is believed that the anode and cathode actually cause a chemical reaction. In other embodiments the anode and cathode are believed not to cause a chemical reaction.

The sampling plate preferably comprises a loading port. In one embodiment the loading port is arranged on a top face of the sampling plate. Such a top-fill arrangement is readily accessible for loading a liquid sample, especially for those with reduced dexterity, such as the elderly or infirm. Furthermore, such sampling plates may be thin in profile. Preferably a top-fill loading port is arranged directly above or over the sample zone. This means that the liquid substance, once loaded at the loading port, is delivered straight to the sample zone, and this may be assisted by gravity. Such an arrangement also allows gravity to assist or cause splitting and/or delivery of the liquid sample into the at least two testing zones. This helps to ensure that each sample forms within its respective testing zone as a fully discrete sample, rather than being linked to other samples by liquid substance remaining along a fluid path.

In another embodiment the loading port is arranged at one end of the sampling plate. This has its own advantages, over a top-fill arrangement. Firstly, it is a traditional approach, and users are familiar with it. This is of significant benefit particularly in relation to older patients who may not adapt readily to new blood delivery formats. Secondly many patients may use it more accurately. It can be difficult to "aim" well at a top-fill loading port.

The loading port is preferably circular or rectangular. Preferably the loading port has an area of between 5 and 10 $mm^2$, more preferably between 6 and 8 $mm^2$. Preferably the loading port comprises an opening in a covering tape. Preferably the covering tape is a hydrophilic film. Preferably the hydrophilic film spreads at least some of the liquid sample on its underside (i.e. inside the sampling plate) when in use.

The sampling plate may comprise a spreading means for assisting distribution of the samples to their respective testing zones. The spreading means may comprise the hydrophilic film. In some embodiments, the spreading means may comprise a mesh spreading means over the sample zone. Such a mesh spreading means may permit the liquid substance to pass therethrough into the at least two testing zones. The mesh spreading means helps to spread the liquid substance uniformly over the sampling zone as a whole, and particularly helps spread the liquid substance uniformly over the two or more testing zones.

The mesh spreading means may comprise a mixture of mesh hydrophobic and mesh hydrophilic materials. The mesh spreading means is preferably cross-hatched. The mesh spreading means may comprise parallel strands of hydrophobic material and at least partially orthogonal but parallel strands of hydrophilic material. Alternatively, parallel strands may be alternately hydrophobic and hydrophilic. Provision of hydrophilic material in the mesh spreading means helps to spread the liquid sample. Provision of hydrophobic material in the mesh spreading means helps repel the liquid sample into the testing zones. The mesh spreading means may therefore have a top face coated with hydrophilic material, and a bottom face coated with hydrophobic material.

Where a mesh spreading means is present, it is preferably disposed between the loading port and the sample zone.

Preferably, however, the sample zone is free of mesh spreading means. Preferably a region over the sample zone is free of mesh spreading means. Preferably a region over the sample zone is free of mesh. The sample zone is preferably arranged to spread the liquid sample, preferably unaided by capillary action.

The sampling plate may comprise an information tag, readable by an information tag reader associated with the measurement device. The information tag may include, but is not limited to, product authentication information. This may prevent harmful circulation/use of counterfeit sampling plates. The information tag preferably comprises a performance indicator, arranged to communicate with the measurement device. The measurement device therefore preferably comprises a performance indicator reader (preferably comprised of the information tag reader) to read the performance indicator. Preferably the performance indicator is for automatic performance band calibration. This avoids the need for a user to input a performance band into the measurement device before taking measurements. The performance indicator is preferably a performance band transmitter arranged to communicate with a performance band receiver comprised of the measurement device. Preferably the transmitter is a radio frequency transmitter such as an RFID tag (radio-frequency identification tag).

The information tag may contain batch information, particularly batch information pertaining to the production of the specific sampling plate. Such batch information may allow for total traceability of the sampling plate by reference to batch records. Such batch records may include information regarding the sampling plate's constituent parts, and materials, along with process control and operator efficiency during the sampling plate's production. Therefore the batch information may be a simple master batch number which refers to relevant batch records. Therefore, a faulty sampling plate may be interrogated to provide a reference to all quality records associated with its production. In this case, the information tag may be read by the information tag reader of the measurement device, as described above. However, the information tag may also be read by an information tag reader linked to a computer, which may include the measurement device being linked to a computer.

The sample measurement system may further comprise an adaptor to allow the measurement device to communicate with the sampling plate. The adaptor is preferably in accordance with that described in co-pending application PCT/GB2009/051225 filed on 21 Sep. 2009 by the present applicants. The adaptor may allow a sampling plate of the present invention to be adapted for use with a traditional measurement device. In this case such a traditional measurement device may serve only as a display device to display measurement results, which measurement results are generated by the adaptor itself. In such a case, the adaptor itself may comprise an information tag reader, preferably comprising a performance indicator reader. The performance indicator reader may receive performance band information from the performance indicator of the sampling plate, and use such information to calibrate measurement results before sending the results to be displayed on the traditional measurement device. Compatibility with old measurement devices may be important for a smooth transition to using the technology of the present invention, as the measurement devices are more expensive than the sampling plates. Furthermore, patients often prefer to keep a measurement device with which they are already familiar.

Alternatively, the adaptor may also allow traditional sampling plates to be used with the measurement device of the present invention. In this case, the adaptor may itself comprise an information tag which communicates information about the traditional sampling plate to the information tag reader.

In accordance with a second aspect of the present invention there is provided a measurement device as described in the first aspect. The measurement device is preferably arranged to receive the sampling plate of either the first or second aspect without adaptation, for instance with an adaptor. The measurement device may be handheld.

In accordance with a third aspect of the present invention there is provided an adaptor as described in the first aspect. The adaptor may be connectable between the measurement device and any other sampling plate, or the sampling plate and any measurement device. The adaptor may comprise electrical connectors (contacts) to connect the at least one pair of electrodes of the sampling plate to a power source or terminals within the measurement device.

Where the adaptor is connectable between the sampling plate of the present invention and any measurement device, the adaptor may comprise a signal manipulator. The signal manipulator is preferably arranged in use to manipulate one or more sampling plate output signals to provide one or more adaptor output signals, which adaptor output signals are compatible with the measurement device and usable to measure one or more selected properties of any of the at least two samples of the sampling plate. Preferably none of the one or more sampling plate output signals are compatible with the measurement device. Preferably the number of adaptor output signals is less than the number of sampling plate output signals. Moreover, the signal manipulator may also manipulate one or more signals in the opposite direction, i.e. between the measurement device and the sampling plate.

The adaptor may comprise a processor. Preferably the processor is a computer processor, preferably comprising a microchip. The processor may be comprised of the signal manipulator. The processor preferably manipulates the signals before they are fed into the measurement device.

The adaptor of the present invention allows a user to keep and continue using an old measurement device whilst still benefiting from at least some of the advantages of the sampling plate of the present invention.

In accordance with a fourth aspect of the present invention there is provided an adaptor for connecting any sampling plate (not necessarily as defined in the first aspect) to any measurement device (not necessarily as defined in the first aspect). The adaptor may comprise a processor for managing two-way communication between the sampling plate and measurement device, which may otherwise be incompatible.

According to a fifth aspect of the present invention there is provided a method of testing a medical condition comprising:

a) loading a liquid substance from the body to a sampling plate of the first aspect;
b) operating a measurement device to communicate with the sampling plate to measure one or more selected properties of the liquid substance.

The method preferably comprises testing diabetes. The method may comprise testing for the presence of one or more recreation drugs, and may include tests for alcohol.

The method may comprise testing cardiac conditions, such as elevated adrenalin levels. Potentially any condition which causes a change in concentration of a component in the blood (indicative chemistry) may be tested for.

According to a sixth aspect of the present invention there is provided a diagnostic kit for testing a medical condition, comprising the sampling plate and the measurement device.

Preferred features of one aspect of the present invention are also preferred features of any other aspect.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE EXEMPLARY EMBODIMENTS OF THE INVENTION

The exemplary embodiments of the present invention will be discussed in detail in relation to a sampling plate which provides improved spreading of a liquid sample within a sample zone of the sampling plate whilst preventing overfilling of the sample zone. In the embodiments discussed below, the sampling plate is for sampling blood to enable the taking of measurements of blood glucose levels in a diabetes patient. However, the teachings, principles and techniques of the present invention are also applicable in other exemplary embodiments. For example, embodiments of the present invention are also applicable to other sampling devices where thorough or selective spreading of a liquid sample is important.

Figure 1:
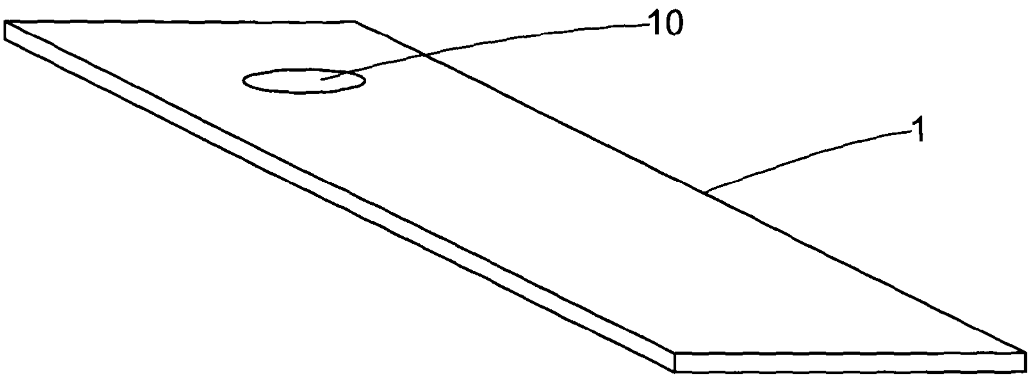
FIG. 1 is an overhead perspective view of a sampling plate relating to an embodiment of the present invention.

FIG. 1 shows a basic sampling plate 1 with a loading port 10 which allows a liquid sample, in this case a blood sample, to be introduced to the sampling plate 1.

Figure 1A:
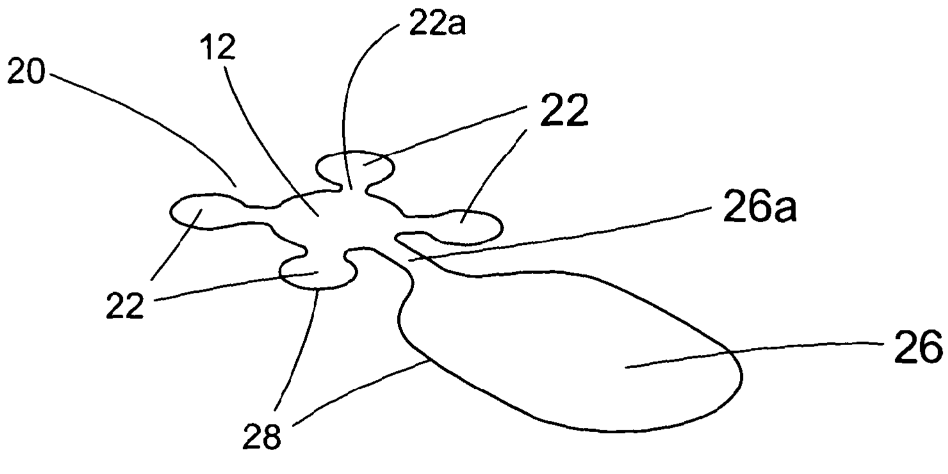
FIG. 1*a* is a schematic-perspective view of a sample zone and overflow reservoir located within the sampling plate of FIG. 1.

FIG. 1*a* schematically shows a sampling area within the sampling plate 10 into which the loaded blood sample flows from the loading port 10. The sampling area has a sample zone 20 with four discrete testing zones 22 separated from each other by a hydrophobic boundary 28 and a distribution centre 12 (in this case a hydrophobic loading platform 12). The sampling area also has an overflow reservoir 26 for receiving and containing excess blood sample which cannot be contained within the sample zone 20. The overflow reservoir 26 is linked to the hydrophobic loading platform 12 of the sample zone 20 via an overflow channel 26*a*, thus enabling excess blood sample to be directed from the sample zone 20 to the overflow reservoir 26. Each testing zone 22 has a testing zone mouth 22*a* (or entrance) which is 1 mm wide, and thus wider than a mouth (on the sample zone 20 side) of the overflow channel 26*a* which is 0.75 mm wide. This differential in mouth size ensures that the testing zones 22 fill first, before the overflow reservoir 26 is used. The overflow reservoir 26 widens significantly from the overflow channel 26 (in a tear drop shape) so as to provide additional draw to pull the excess blood sample in as quickly as possible so as to prevent the sample zone 20 becoming overfilled and thus compromise the discrete nature of the testing zones 22. Once there is no more excess blood sample to draw into the overflow reservoir 26, the pulling stops. Reaching this stop point/equilibrium quickly is essential to allow fast measurements to be taken. The blood samples in their respective discrete testing zones 22 are not drawn into the overflow reservoir 26 because they are held within their testing zones 22 under surface tension.

Figure 2:
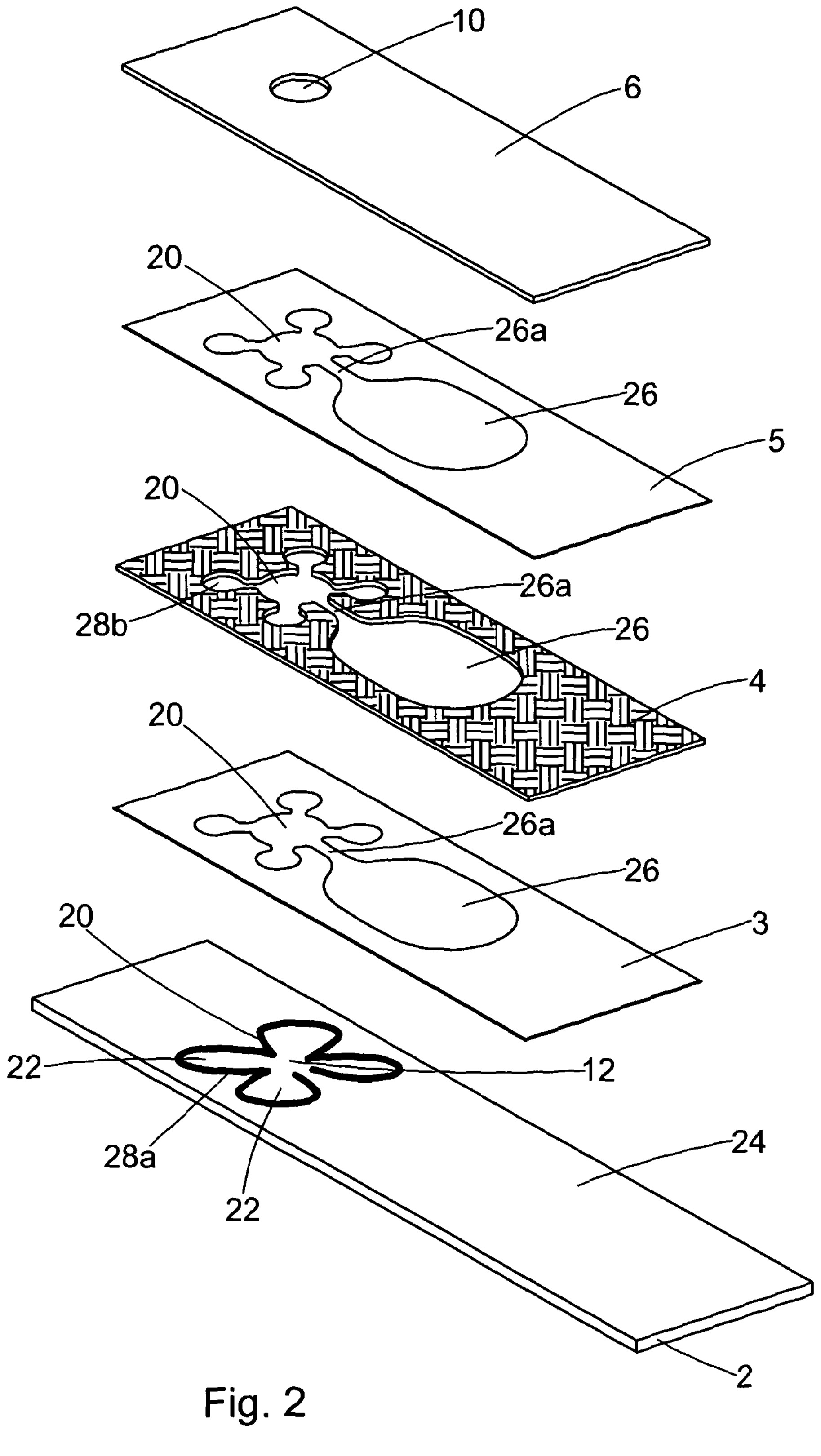
FIG. 2 is an exploded perspective view of various layers of the sampling plate of FIG. 1.

FIG. 2 shows an exploded perspective view of the sampling plate 1 split into the various layers of which the sampling plate 1 is composed, which includes a base plate 2, a first layer of double-sided adhesive tape 3, a layer of hydrophobic mesh 4, a second layer of double-sided adhesive tape 5, and a top layer of hydrophilic film 6.

The base plate 2 has a generally hydrophilic base surface 24 by virtue of a hydrophilic coating of a water-based acrylic polymer and a TWEEN 20 surfactant. The base plate 2 has a sample zone 20. At the centre of the sample zone is a hydrophobic loading platform 12 which has a hydrophobic coating of a hydrophobic acrylic resin, a silicone anti-foaming agent, micronized wax, and fumed silica. Surrounding the loading platform 12 are four testing zones 22, each of which lie on a surface lying beneath the level of the loading platform 12. The four testing zones 22 have respective surfaces which consist of the same hydrophilic material as the hydrophilic base surface 24. The perimeter of the testing zones 22 is defined by a printed hydrophobic ink boundary 28*a*, composed of the same hydrophobic coating material as above which ensures the blood sample is fully contained within the sample zone 20. Lying centrally between the testing zones 22 is a raised loading platform 12 which first receives the blood sample introduced through the loading port 10. The loading platform 12 not only partitions and supplies a received blood sample to the testing zones 22, but also divides the testing zones into discrete testing zones so that an individual blood sample contained within one of the testing zones 22 is completely discrete and separate from other individual blood samples in the other testing zones 22.

The first double-sided adhesive tape 3 is adhered to the top of the base plate 2. The adhesive tape 3 has a cut-out sample zone 20 region so that the sample zone 20 on the base plate 2 is exposed and uncovered. The adhesive tape 3 also has a cut-out overflow channel 26*a* and reservoir 26 region. The adhesive tape 3 is made of a non-porous polyester layer coated with synthetic rubber adhesive.

To the upper surface of the double-sided adhesive tape 3 is adhered a hydrophobic mesh 4. The hydrophobic mesh 4 also has a cut-out sample zone 20 region (i.e. an empty portion) to leave the sample zone 20 on the base plate 2 exposed. The hydrophobic mesh 4 also has a cut-out overflow channel 26*a* and reservoir 26 region. The internal edge of the cut-out region provides a hydrophobic boundary 28*b* to the sample zone 20, particularly to the testing zones 22 (in addition to the printed hydrophobic boundary 28*a*), and also to the overflow reservoir 26. The hydrophobic mesh 4 is an air porous body in that it is porous to air. The hydrophobic mesh 4 is, however, completely impermeable to the blood sample, thereby allowing the inside edges of the cut-out region of the hydrophobic mesh 4 to entirely contain the blood sample.

The second double-side adhesive tape 5 is identical to the first 3, and is adhered to the top of the hydrophobic mesh 4.

The hydrophobic mesh 4 may be incorporated into a preformed cover tape which is itself composed of numerous layers, including the following:

Layer 1—25 gsm (grams per square meter) of synthetic rubber adhesive.

Layer 2—12 micron thick clear polyester (carrier).

Layer 3—10 gsm of synthetic rubber adhesive.

Layer 4—140 micron thick mesh material 4 (available as Sefar™ Product Code: 07-120 34).

Layer 5—10 gsm of synthetic rubber adhesive.

Layer 6—12 micron thick clear polyester (carrier).

Layer 7—25 gsm of synthetic rubber adhesive.

The mesh material (i.e. Layer 4) is composed of polyester (PET) and is formed as a woven mesh from individual strands of thread. These threads are partially melted together to provide stability and structure to the mesh. The mesh material is then coated with the above mentioned hydrophobic coating. The hydrophobic coating coats all surfaces of the mesh, including inside the pores. Layers 1-3 are the first double-sided adhesive tape 3 and layers 5-7 are the second double-sided adhesive tape 5. The mesh material is an air porous body with an average pore size of 120 microns, a thread diameter of 88 microns, and an average void space (i.e. porosity) of 34%.

The final top layer 6, which is adhered to the top of the second double-sided adhesive tape 5, is a hydrophilic film having a single 3 mm diameter cut-out hole which corresponds to the loading port. When all the layers are adhered together, the loading port 10 is directly above the hydrophobic loading platform 12 which remains exposed and uncovered. The top layer 6 does, however, cover all remain parts of the sample zone 20.

In use, a blood sample applied to the loading port 10 flows downwards under gravity onto the hydrophobic platform 12. From the hydrophobic platform 12 the blood sample spreads into the testing zones 22 in a substantially uniform manner, assisted by the hydrophobic mesh 4 which, by being air porous, readily receives displaced air from the testing zones 22 as the blood sample flows thereinto. When the blood sample reaches the hydrophobic boundary 28, be it formed from the internal edges 28*b* of the hydrophobic mesh 4 or the printed hydrophobic boundary 28*a*, it is contained within the boundary 28. The hydrophobic mesh 4 is completely impermeable to the blood sample and is only permeable to air. Once the testing zones 22 are full, excess blood sample starts to pass into the overflow reservoir 26 via the overflow channel 26*a* (which acts as a narrow neck to the overflow reservoir 26). The overflow reservoir 26, which has a greater capacity than all four testing zones 22 combined, will accommodate a large amount of excess blood. The air porous nature of the perimeter of the overflow reservoir 26 again assists entry of excess blood sample into the overflow reservoir 26 by allowing for facile displacement of air.

FIGS. 3*a*-3*d* show an end-fill sampling plate for testing of a single blood droplet, with a volume of approximately 3 μl (though able to handle a reasonable latitude of node, in the form of a blood volumes). There is a sample application point 50 at the end of the strip, leading to a node, which serves as a sample distribution centre 52. In a cruciform arrangement about the sample distribution centre there are four delivery tracks 60; leading to four sensor regions 54, 54', 54" and 54'" in which discrete blood volumes, each of which can be subjected to measurements, independently of the other volumes. Forwards of the sample distribution centre is a separator reservoir 56. The passageway from the sample distribution centre 52 to the separator reservoir 56 is via a narrow neck 58. Passageways to the sensor regions 54 are hydrophobic in character, so that blood flowing into the strip can wash through these passageways, despite their hydrophobic character, but are inhibited from leaving the sensor regions, by flow in the opposite direction. The arrangement is similar to that described in FIGS. 1 and 2.

Figure 3A:
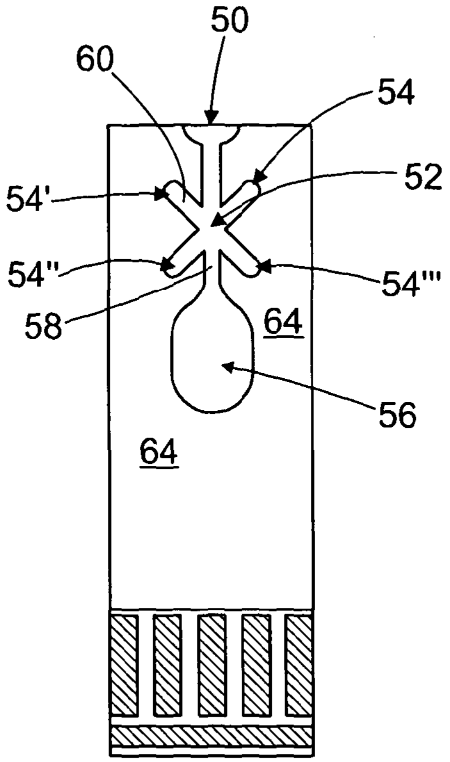
FIGS. 3*a*-3*d* show a second embodiment of sampling plate at different stages of filling by blood.
Figure 3B:
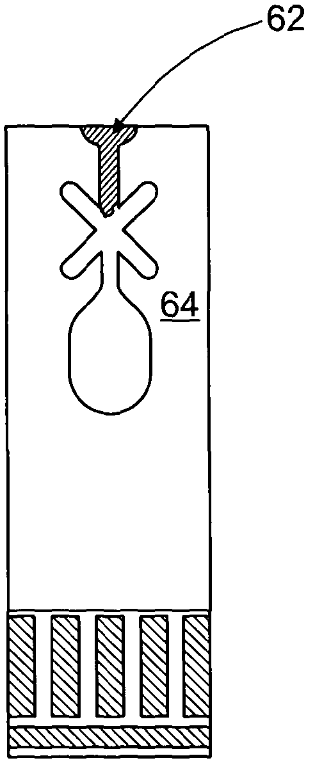
Figure 3C:
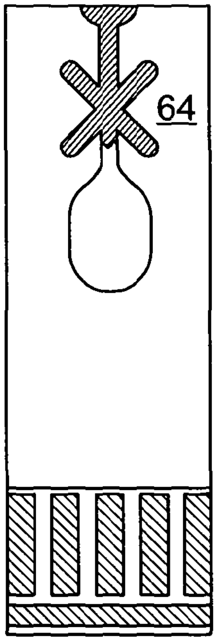
Figure 3D:
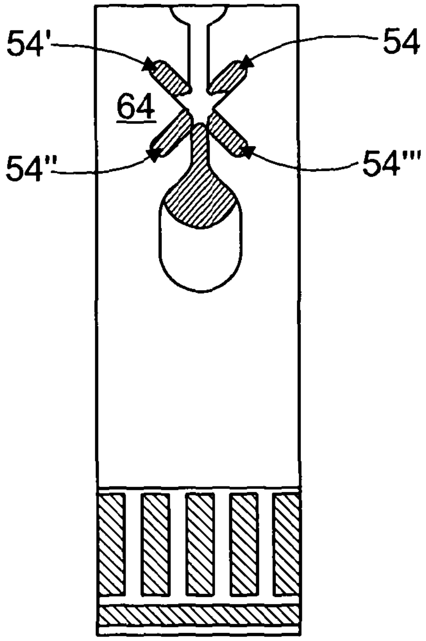

In the sequence shown in FIGS. 3*a* to 3*d*, FIG. 3*a* shows the strip before blood is delivered to the sample application point. In FIG. 3*b* the blood has been applied to the sample application point and is being drawn inwards. The blood is indicated by shading 62. Blood is drawn into the sample distribution centre and thence into four delivery tracks 60, and the four sample zones. This state is shown in FIG. 3*c*. The air displaced by the application of the blood and the subsequent advancement of the sample is accommodated or released by surrounding body 64 which is porous to air but impermeable to blood. Once the delivery tracks 60 and sensor regions 54 are all filled the separator reservoir 56 starts to draw away the excess blood, from the sample distribution centre, and from the delivery tracks 60, leaving the four discrete, separated sub-samples. This state is shown in FIG. 3*d*. Again, air to be displaced, now from the reservoir, may be released into air porous body around it.

A sample measurement system is now described in which the principles outlined above in relation to the sampling plates are described above are applicable.

Figure 4:
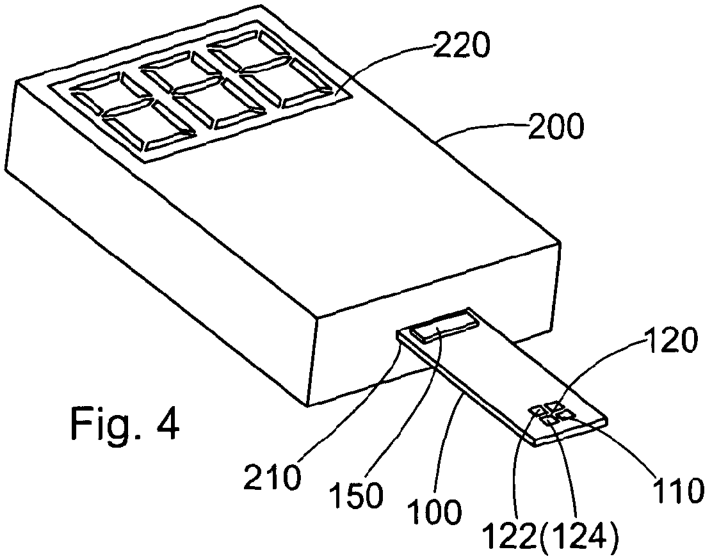
FIG. 4 is a projection view of a sample measurement system according to an exemplary embodiment.

FIG. 4 is a projection view of a sample measurement system according to an exemplary embodiment, and shows a sampling plate 100, based on a multilayered sampling plate 1 of FIGS. 1 to 3, inserted into a measurement device 200. The sampling plate 100 has a loading port 110 for receiving a blood sample on a top face of the sampling plate 100. Directly below the loading port 110 is a sample zone 120 having four discrete testing zones 122, which in this example are three dimensional wells 122. Each well 122 is 250 μm deep, is 1.5 mm wide, and 1.5 mm long. In this example, each of the four wells 122 contains an ink 124. Three of the wells contain an active ink along with a mediator ink. The mediator helps conductivity, and the active ink contains a test material selected for its reactivity with glucose in the blood. In this example, the active ink contains glucose oxidase. The remaining well contains a passive ink along with the mediator ink, where the passive ink is identical to the active ink but without the glucose oxidase. In another embodiment at least one of the wells is spiked with a known quantity of glucose. This assists calibration when conducting measurements. The measurement device 200 has a plate port 210 into which the sampling plate 100 is inserted, and a screen 220 for displaying results, measurements, and/or other desirable data.

In an alternative embodiment the wells 122 are hemispherical. The curved nature of the hemispherical wells is advantageous in that there is a lower risk of the dried inks (in this case flexographically printed conductive inks) cracking than where there are sharp corners such as in rectangular or square wells. In this example, the hemispherical wells (or dimples) have a depth of 150 μm.

Furthermore, the sampling plate 100 has a performance indicator 150. The performance indicator 150 contains information about the sampling plate which, in this example, is transmittable to the measurement device 200. The measurement device 200 has a performance indicator reader (not shown) which reads the information from the performance indicator 150. In this example the performance indicator 150 is an RFID tag which transmits calibration data to the performance indicator reader (a radio frequency receiver). The calibration data relates to the quality of the sampling plate ("performance bands"), for which there can be variation from batch-to-batch or intra-batch. The measurement device 200 then automatically corrects measurements based on the calibration data received to ensure that measurements are consistent from plate to plate, regardless of batch/intra-batch variation.

The performance indicator 150 additionally contains product authentication information to prevent against harmful circulation/use of counterfeit sampling plates. The authentication information is in the form of an encrypted code which can be verified and validated by the measurement device 200.

The performance indicator 150 contains batch information pertaining to the specific sampling plate. The batch information includes a master batch number which refers to the relevant batch records for that particular sampling plate. This renders each sampling plate traceable back to its source materials and production.

The measurement device 200 has a random access memory (RAM) for storing both information from the performance indicators 150 and information/results generated during blood tests. The stored performance indicator information is automatically linked to the corresponding blood test information/results for any particular sampling plate/test.

Blood test results include: measurements, units of measurements, time and date, and also additional information inputted by a patient, including whether a test was performed before or after a meal, before or after exercise, medication type, and quantities. Test results stored within the memory are accessible to allow for a historical analysis of the test results. The information stored in the memory is easily transferable to a computer by linking the measurement device 200 to a computer. In this example, the computer is arranged to assemble a database from the test results to allow a patient's care regime to be carefully monitored.

In this example the memory (RAM) is split into visible and invisible memory, where the visible memory is readily accessible as described above. The invisible memory is only accessible to technicians trained in how to interrogate the measurement device 200. The invisible memory stores batch information for each sampling plate used in a test. Each piece of batch information is linked to a respective blood test result. This allows for interrogation of the measurement device to establish if, when and where an error has occurred. If an error has occurred, the batch information can be used to establish whether there was a problem with a batch of sampling plates (by reference to the relevant batch records), or whether the fault resides with the measurement device itself. This allows any faults to be diagnosed and resolved quickly. This is especially true where batch records are electronically accessible.

In this example, the invisible memory also stores information regarding errors generated during tests, including warning messages displayed to the user. System calibration problems are also stored in the invisible memory.

Figure 5:
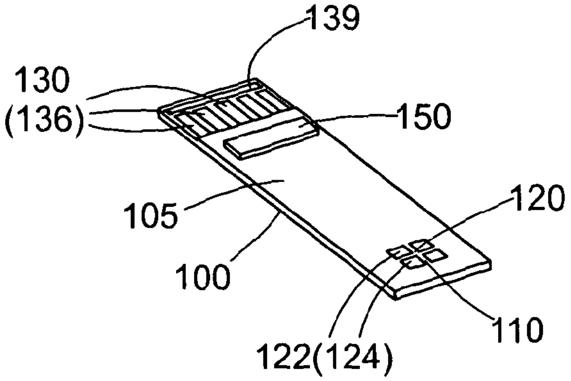
FIG. 5 is a top projection view of a sampling plate according to the exemplary embodiment of FIG. 4.

FIG. 5 is a top projection view of the sampling plate 100, and in addition to FIG. 1 shows a covering tape 105, having an aperture 110 corresponding with the loading port 110, and a series of electrodes 130, the ends (terminal contacts 136) of which connect to electrical terminals within the measurement device 200 to allow measurements to be taken.

Figure 6:
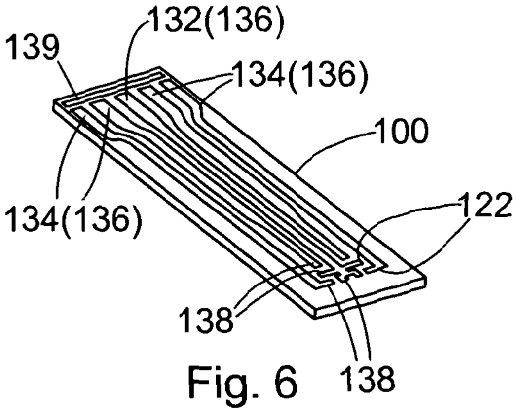
FIG. 6 is a top projection of internal components of the sampling plate of FIG. 5.

FIG. 6 is a top projection of internal components of the sampling plate, and shows the electrodes 130 which, in this example, are formed as a printed circuit board upon a base plate 2 (see FIG. 2). There is a central single common electrode 132 common to all four wells 122. Four individual electrodes 134 join each well. In this example the common electrode 132 is a cathode, and the four individual electrodes 134 are anodes. Each electrode has a terminal contact 136, and an electrolyte contact 138. Each well 122 bridges a gap between each pair of electrodes 130, specifically between a pair of electrolyte contacts 138, where each pair consists of the common electrode 132 and an individual electrode 134. When an electrolyte is present in any of the four wells 122, a current can flow through its corresponding pair of electrodes 132, 134 when the sampling plate 100 is inserted into the measurement device 200 and the measurement device 200 is operated. In this example a four-channel circuit may be produced, enabling four sets of electrochemical measurements on a single sampling plate. The terminals within the measurement device 200 provide a potential difference (voltage) of between 400 and 500 mV. The measured current (microamps) is then proportional to the concentration of glucose within a given blood sample. The sampling plate 100 also comprises a electrical switch bar 139, which acts as a switch to turn on the measurement device 200 when the sampling plate 100 is inserted thereinto.

Figure 7:
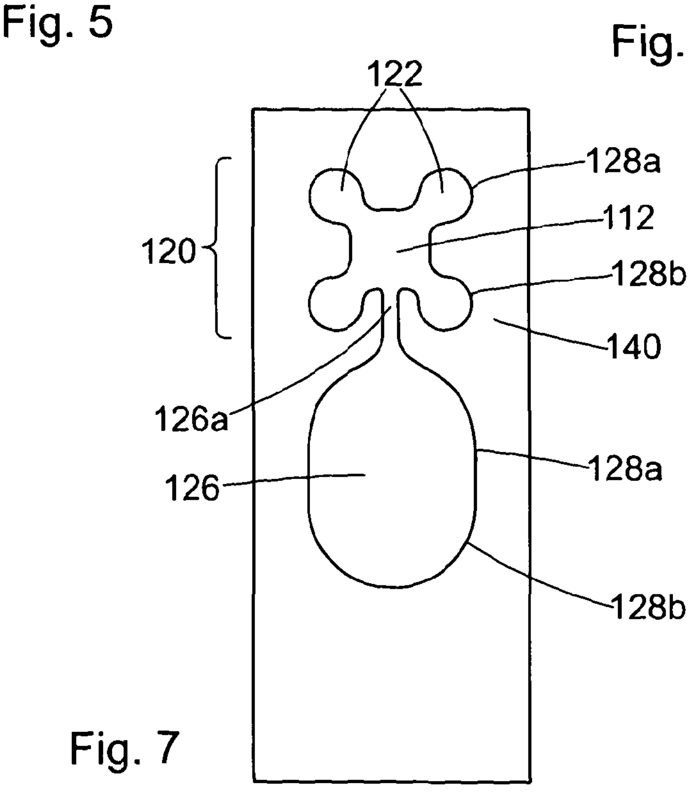
FIG. 7 is a top view of a sample zone of the sampling plate of FIG. 5.

FIG. 7 is a top view of the sample zone 120 of the sampling plate 100 and its surrounding hydrophobic mesh 140. The sample zone 120 is much as described in relation to the sample zone 20 of FIGS. 1 to 2 in that it has wells 122 of hydrophilic material, each well 122 being separated from each other well 122 by a hydrophobic boundary 128 comprised of the printed hydrophobic ink boundary **128*a*, internal edges 128*b* of the hydrophobic mesh 140, and the hydrophobic loading platform 112 (in this case the loading platform 112 is the central crossing point of the printed hydrophobic ink boundaries 128*a*). In addition there is an overflow reservoir 126 linked to the loading platform 112 via an overflow channel 126*a*. Again the overflow reservoir 126 is surrounded by the hydrophobic mesh 140**.

Figure 8A:
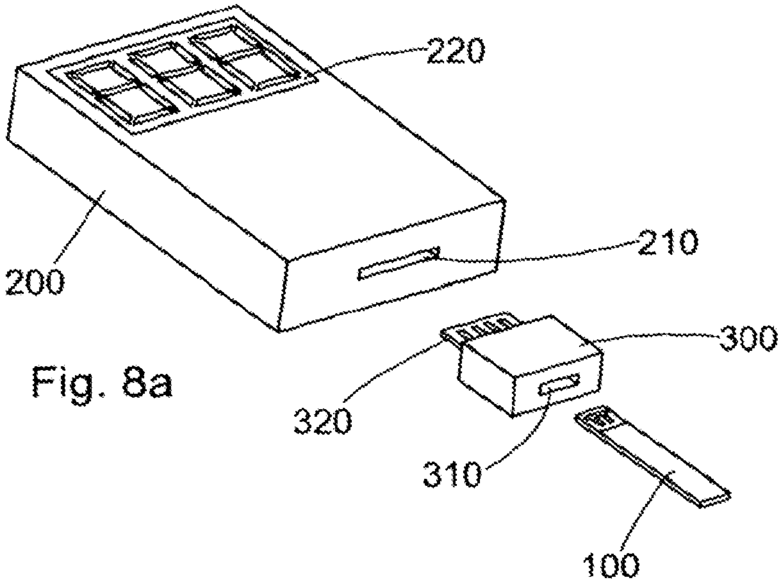
FIG. 8*a* is a projection view of a sample measurement system according to another exemplary embodiment.
Figure 8B:
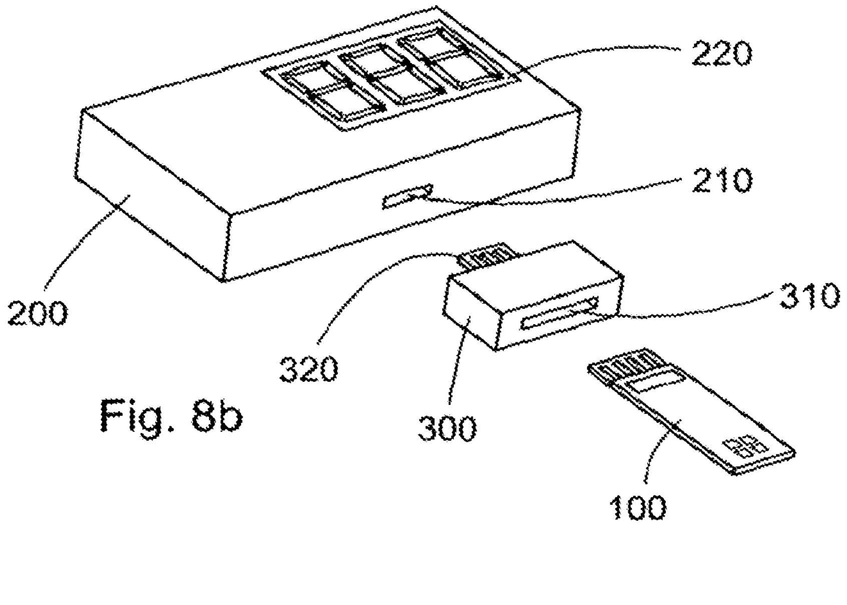
FIG. 8*b* is a projection view of a sample measurement system according to another exemplary embodiment.
Figure 8C:
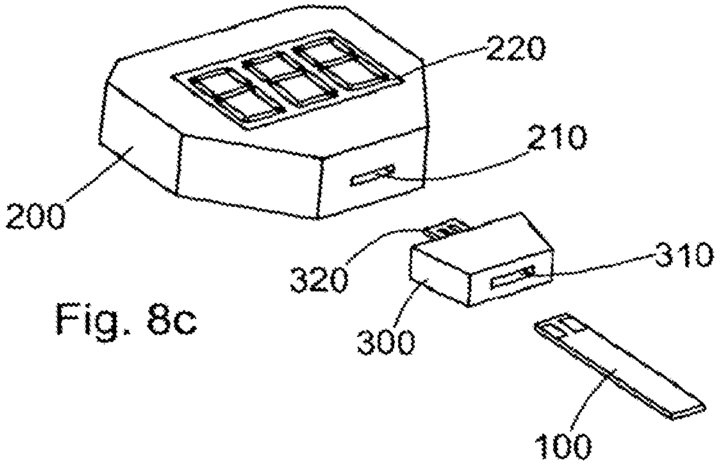
FIG. 8*c* is a projection view of a sample measurement system according to another exemplary embodiment.

FIGS. **8*a*, 8*b*, and 8*c* are projection views of a sample measurement system according to alternative exemplary embodiments. In each case, a sampling plate 100 is connected to a measurement device 200 via an adaptor 300. In each case, the sampling plate is not directly compatible with the measurement device (i.e. not designed to fit directly into the plate port 210). The adaptor 300 has a plate end 310 (or plate insertion end) designed to receive the sampling plate 100. The plate end 310 has electrical contacts which receive and connect with the terminal contacts 136 of the sampling plate electrodes 130. The adaptor 300 has a device end 320 arranged to simulate a sampling plate which fits directly into the measurement device, and therefore has electrical contacts (pins) arranged to link the electrodes 130 of the sampling plate 100 to corresponding electrical terminals within the measurement device 200. Within the adaptor is a processor which manages the two-way communication between the sampling plate 100 and the measurement device 200. Embodiments of the adaptor 300 enable compatibility between various sampling plates 100 and measurement devices 200. FIG. 8***a* shows the measurement device 200 of the embodiment of FIG. 4 adapted to receive an otherwise incompatible sampling plate 100. FIG. 8*b* shows the sampling plate 100 of the embodiment of FIGS. 4 to 7 adapted to fit into an otherwise incompatible measurement device 200. FIG. 8*c* shows a sampling plate 100 (not of the previous embodiment) adapted to fit into an otherwise incompatible measurement device (not of the previous embodiment).

It will be understood that where the measurement device 200 is a traditional device or other device not arranged or adapted in accordance with the invention, such a device 200 will not have a performance indicator reader, but may still be capable of providing accurate measurements from the sampling plate 100 where the "performance band" is inputted manually into the measurement device.

Figure 8D:
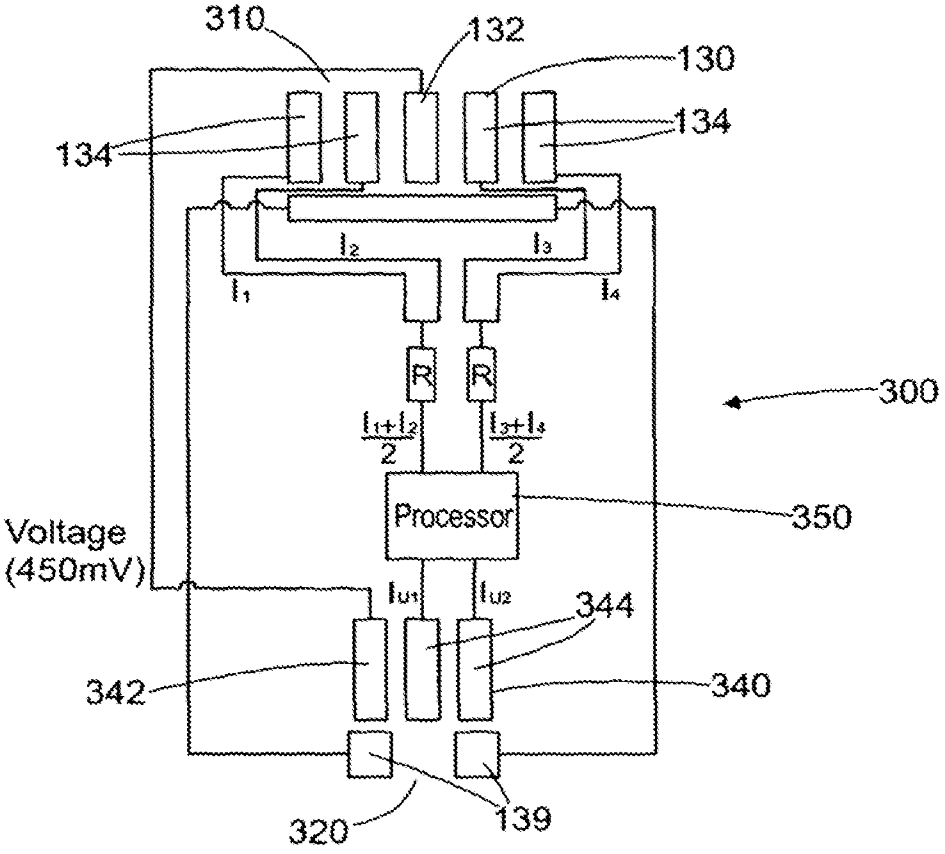
FIG. 8*d* is a circuit diagram showing the internal components of the adaptor of FIG. 7*b;*

FIG. 8*d* shows a circuit diagram of the components within the adaptor 300 of FIG. 8*b*. The electrodes 130 of the sampling plate 100, as illustrated in FIGS. 4 to 7 interface with the adaptor 300 at contacts at the plate end 310, and are connected by printed circuitry to electrodes 340 at the device end 320. The central single common electrode 132 is directly electrically connected to a primary electrode 342 at the device end 320. In this example, both of these electrodes are cathodes. The four individual electrodes 134 (anodes) connect to two secondary electrodes 344, at the device end 320, via a signal manipulator which, in this example, is a computer processor 350. The processor 350 manipulates four independent signals from the sampling plate 100 to produce two signals that are compatible with the traditional measurement device's hardware and calibration software. Signals $I_1$ and $I_2$ become $I_{U1}$, and signals $I_3$ and $I_4$ become $I_{U2}$.

Figure 8E:
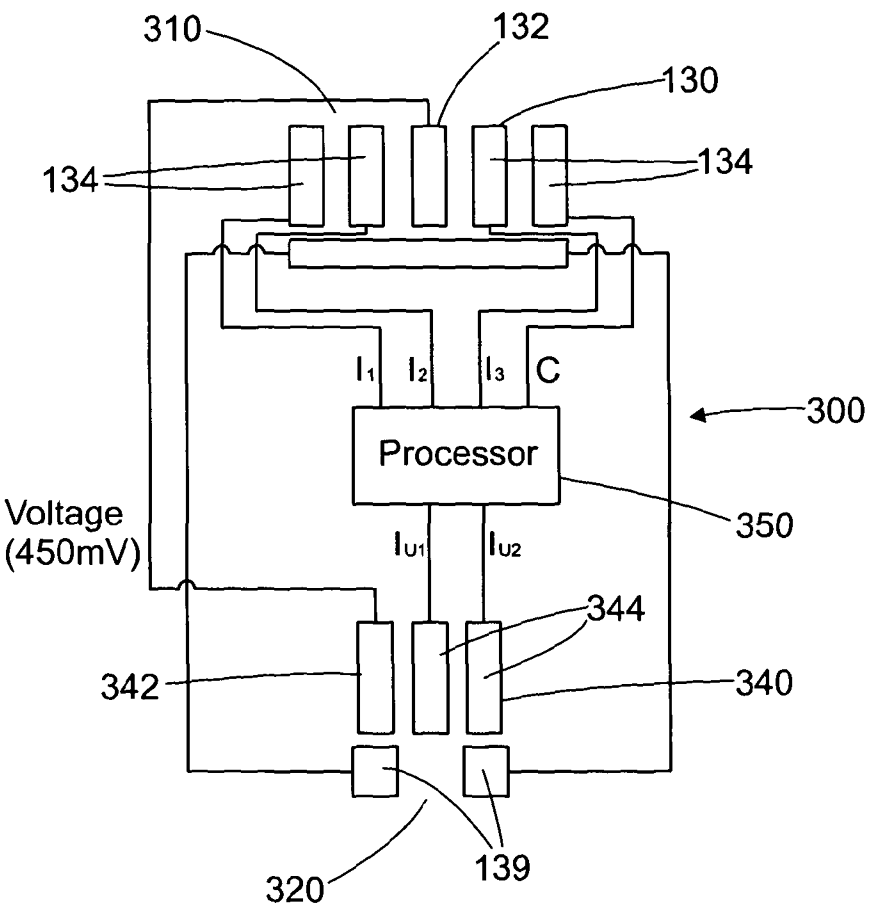
FIG. 8*e* is a circuit diagram showing the internal components of an alternative adaptor of FIG. 7*b;*

FIG. 8*e* shows an alternative arrangement whereby the sampling plate 100 employs three of the anodes 134 ($I_1$,$I_2$,$I_3$) for sample measurements, and one of the anodes 134 (C) for correction measurements. In this case, three of the currents ($I_1$,$I_2$,$I_3$) are generated through an enzymatic reaction, as discussed above, but a fourth current (C) represents a background signal, which is used for correction. The processor performs a first calculation to generate three corrected glucose signals from the three signals $I_1$, $I_2$, and $I_3$, and also signal C. In this example, the measurement device 200 needs to receive two input signals to make blood glucose measurements. Therefore the processor then manipulates the three corrected signals to produce two signals, $I_{U1}$ and $I_{U2}$, which are compatible with the particular measurement device 200.

As shown in FIG. 8*b*, the adaptor 300 fits into the plate port 210 by virtue of the device end 320. The device end 320 simulates almost entirely the electrical contacts of otherwise directly compatible sampling plates, except the electrical switch bar 139 is divided into two separate terminals, which connect only when a sampling plate 100 is inserted into the plate end 310 of the adaptor 300. This prevents the measurement device 200 switching on when the adaptor 300 is inserted without a sampling plate 100.

The measurement device 200 of either embodiment of FIG. 4 or 8*a*-8*c* has a data carrier containing software. The data carrier may also receive and store data, such as measurements. The measurement device 200 operates pursuant to the software. The software has a default setting which takes current (microamps) measurements from three of the four channels. In this example, the measurement device 200 uses multiplexing to measure each of the four channels separately and sequentially. In other examples measurements from all four channels are taken simultaneously. "Multiplexing" is where a cycle of pulse measurements are taken from each channel in turn before repeating the cycle. In this case, multiplexing occurs at approximately 50 Hz. The data is processed and the results are displayed on the screen 220. In this example the results are indicative of blood glucose levels. Results may be displayed as raw data, or as "high", "low", etc. Messages relating to the new test result and how it compares to the patient's personal parameters will be displayed. Measurement devices 200 applicable to the present invention are well described in WO 2008/029110, along with their operation.

The measurement device 200 according to the embodiments of both FIGS. 4 and 8 can interface with an ordinary personal computer to allow the raw data to be processed in a customised manner. This furthermore allows unique presentation of the results. The device 200 is simply connectable to a computer as a standard external disc drive.

The sample measurement systems described above are simple to use. The following procedure is employed:

1. The diabetic patient inserts a new test strip 100 into the plate port 210.
2. The measurement device 200 then prepares for receiving measurements and conducts system checks (approximately 3 seconds).
3. The device 200 requests the patient to apply a blood sample to the sampling plate 100.
4. The patient applies a blood sample to the sampling plate 100 via the loading port 110.
5. The device 200 takes measurements for approximately 5 to 10 seconds.
6. The device performs calculations, statistical manipulations, and displays measurement results and accuracy levels.
7. The measurement results and accuracy levels are stored in the device's 200 memory.

In this example the device 200 switches on as soon as the plate 100 is inserted into the port 210, by virtue of the switch bar 139. During step 4, the sampling plate 100 automatically separates the blood into the four discrete wells 122. The hydrophobic mesh 140 encourages uniform spreading of blood across the sample zone, by providing ventilation for the air being displaced, such that blood sample enters the wells 122 under the influence of both gravity and the hydrophilic attraction provided by the hydrophilic surface of the wells 122. Blood does not spread beyond the hydrophobic boundary 128, particularly as the mesh 140 is entirely impermeable to blood.

The device 200 processes the measurements in view of the calibration data from the RFID tag 150, and also internally calibrates and/or performs accuracy level calculations from the measurements taken from each of the wells 122. Internal calibration is effected by the use of statistical algorithms based on the inks and components of the blood which are the subject of measurement. Statistical algorithms are also used to establish the accuracy level of the measurements taken. The screen 220 then displays the result either as raw data, such as blood sugar concentration, or as "high" or "low", depending on the user's preference. The device 200 also displays the accuracy level. Messages relating to the new test result and how it compares to the patient's personal parameters will be displayed.

Results are calculated on the basis of current decay across a particular well as measured over 5 to 10 seconds. The rate of decay provides an indication of blood glucose levels.

In this example the measurement device 200 also displays, on the screen 220, an accuracy level or an error message if the accuracy level is outside a predefined range. Regulation dictates that blood glucose measurement systems must provide test results with a minimum accuracy level. Thus the predefined range will always comply with regulatory standards. Thus any results with an accuracy outside these limits will give rise to an error message, indicating that the test should be repeated.

In this example, the sampling plates 100 are produced as follows.

Figure 9:
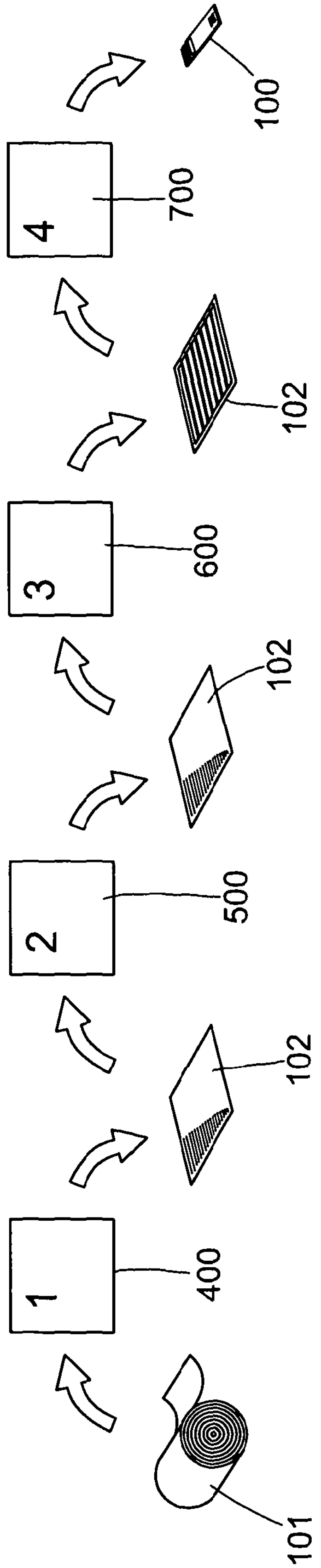
FIG. 9 is a flow diagram overview of the method of producing a sampling plate.

FIG. 9 is a flow diagram overview of a method of producing a sampling plate from a continuous sheet. The diagram shows the method being carried out at four processing stations, including:

Step 1: A flexographic printing station 400;

Step 2: A precision dosing station 500;

Step 3: A card finishing station 600; and

Step 4: A strip cutting and vialing station 700.

A continuous sheet in the form of a continuous roll is fed into the flexographic printing station 400. In this example, the continuous sheet is calendered cardboard. It is calendered to provide the sheet with a greater level of uniformity to reduce variations in the strips ultimately produced. In this example, the continuous sheet is also supplied with a surface that is hydrophilic in nature. Alternatively a hydrophilic coating may be applied at the beginning of the flexographic printing process. The output of step 1 is a smaller continuous sheet, in this example a card having 200 sampling plates (strips), arranged as 8 rows of 25 strips. Inks are then precisely dosed during step 2 at the precision dosing station 500. Step 3 involves finishing the card by applying additional layers at the card finishing station 600. Finally Step 4, at the strip cutting and vialing station 700, involves cutting the card to provide individual strips ready for use and packaging sets of strips in vials.

Figure 10:
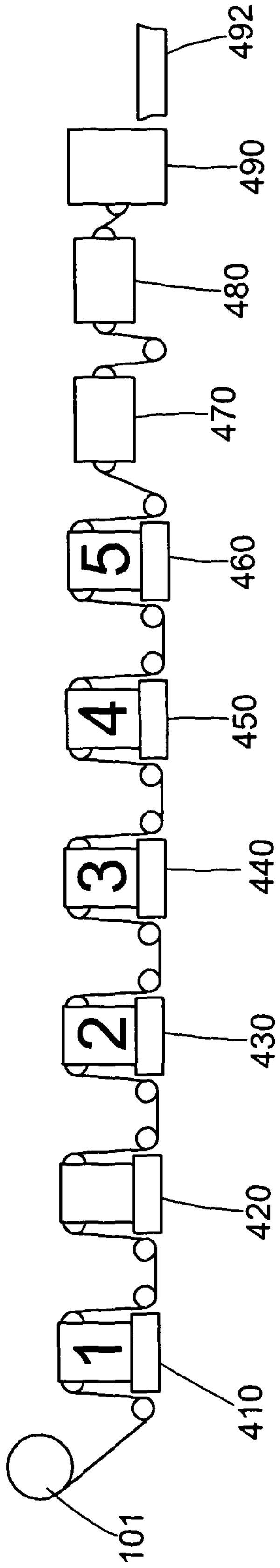
FIG. 10 is an expanded flow diagram of Step 1 of FIG. 9.

FIG. 10 is an expanded flow diagram of Step 1 of FIG. 9, and shows the flexographic printing process at the flexographic printing station 400 in more detail. The flexographic printing station 400 comprises a plurality of in-line flexographic print modules and further process modules. A continuous roll 101 is first fed into a first flexographic print module 410 for printing the electrodes 130 and registration points. There is a registration point at regular intervals along the roll 101. The roll then proceeds to a surface deformation module 420, where four three-dimensional wells 122 are formed, in respect of each strip 100 on the roll, using a roller tool set. The roll then proceeds to a second flexographic print module 430, where the insulation layer is printed over the electrodes, so as to leave terminal contacts 136 and electrolyte contacts 138. The insulation layer is composed of ingredients that do not conduct electrical signals (resin and photo-curing agents), and is applied between the electrodes 130 to minimise signal interference which, for instance, can be induced in neighbouring electrodes if uninsulated. At a third flexographic print module 440, the hydrophobic boundary 128 is printed around the wells 122. At a fourth flexographic print module 450, a first decorative artwork colour is flexographically printed in respect of each strip 100 on the roll 101. At a fifth flexographic print module 460, a second decorative artwork colour is printed. Optionally there may be additional flexographic print modules for printing additional artwork. Such flexographic printing allows for high resolution images small enough to be printed on a sampling plate 100. Such images may provide simple information or alternatively enhance product aesthetics, or include branding etc. The roll then proceeds to an edge trimming module 470, where edges of the roll 101 are trimmed based on the positions of the registration points. The roll then enters a perforating module 480, where accurately aligned micro-perforations are applied to the roll along an edge of each row of strips. Finally the roll enters a card cutting module 490 where the roll is cut to produce a number of cards 102, which are deposited in a first card collector 492. Each card contains two hundred strips (8 rows of 25 strips). The roll 101 proceeds through the flexographic printing station 400 on conveyer rollers 402 until it is cut into cards 102. Each flexographic print module has a flexographic unit and a drier. The printing of an individual layer is accurate to +/−30 micrometers. Print layer on print layer accuracy is +/−50 micrometers. The throughput through the flexographic printing station 400 is generally about 300 meters/min.

In alternative embodiments, there is a surface coating flexographic printing module before the first flexographic printing module 410. The surface coating module applies a surface coating of resin and surfactant which seals the surface so that the roll 101 is less porous and less likely to absorb inks. The surface coating gives the roll 101 a substantially uniform surface energy throughout, and a substantially uniform porosity.

In some embodiments there may be multiple layers of electrode applied so as to increase conductivity. The extra layers are applied on top of the original layer(s). This may be performed at the same flexographic printing module 410, or additional electrode layers may be applied at subsequent printing modules. The electrode inks are composed of resin, surfactant, carbon and graphite.

In an alternative embodiment, the surface deformation module 420 may be the final module after all flexographic inks have been applied. This can help improve the accuracy of the ink application processes.

Figure 11:
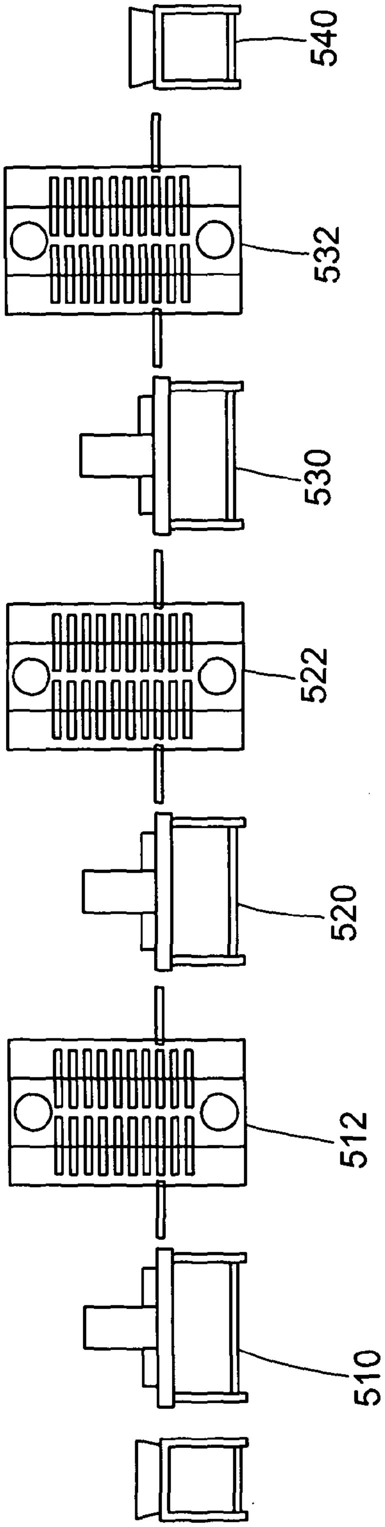
FIG. 11 is an expanded flow diagram of Step 2 of FIG. 9.

FIG. 11 is an expanded flow diagram of Step 2 of FIG. 9, and shows the precision dosing process at the precision dosing station 500 in more detail. Here inks are nano-dosed (120 nL +/−5 nL per ink) with volumetric and positional precision, with each well 122 creating an excellent three-dimensional target for each ink. Chemical solutions of the inks are produced, in this example, with ethanol as solvent. A card 102 from Step 1 is first introduced to a first dosing unit 510, where an ink solution containing a mixture of a mediator ink and an active ink is dosed into one well 122 per strip 100 on the card 102. It should be noted that embodiments which use the same ink in more than one well per strip may have each such well dosed with the same ink at the same dosing unit. The card 102 is then dried in a first drying unit 512 The card 102 proceeds to a second dosing unit 520 where another ink solution of mediator/active ink is dosed to another well 122 per strip 100 on the card 102. The card is then again dried in a second drying unit 522. Finally the card 102 proceeds to a third dosing unit 530 where yet another ink solution of mediator/active ink is dosed to a further well 122 per strip 100 on the card 102. The card is then dried in a third drying unit 532 and deposited in a second card collector 540. Optionally a fourth ink solution may be dosed into a further well, which ink solution contains a mediator/passive ink. In this embodiment the active ink contains glucose oxidase. However, in other embodiments the active ink may be different to allow measurements relating to a condition other than diabetes. Alternatively the active inks present may be different from each other to allow simultaneous measurements relating to a plurality of conditions. It is during the precision dosing that different inks may be dosed depending on the measurements ultimately desired. For instance, dosing one ink for measuring glucose levels, and another for measuring ketone levels is easily achievable.

Figure 12A:
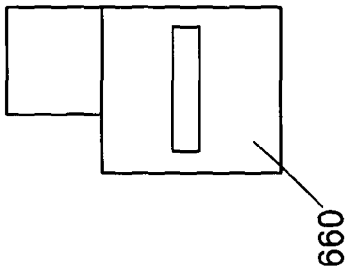
FIG. 12*a* is a side view of a testing unit used in the method of FIG. 9.
Figure 12:
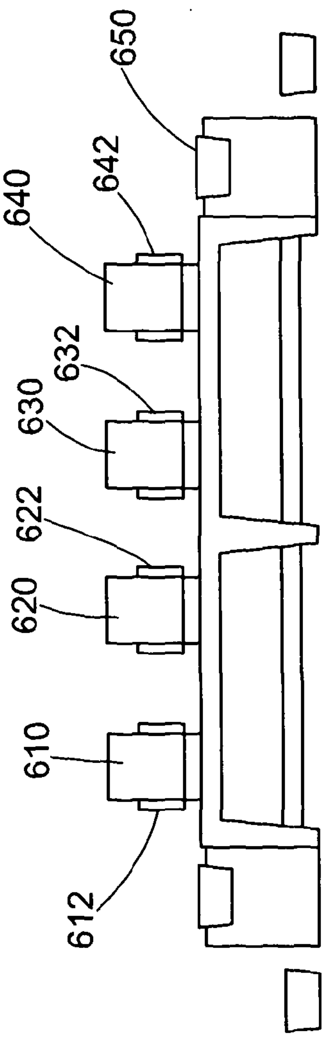
FIG. 12 is an expanded flow diagram of Step 3 of FIG. 9.
Figure 13:
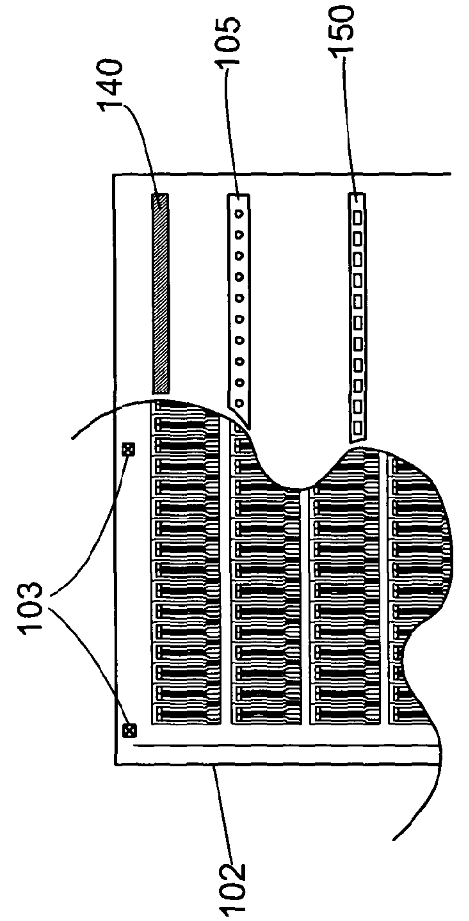
FIG. 13 is a top view of a card produced from Step 3 of FIG. 9.
Figure 14:
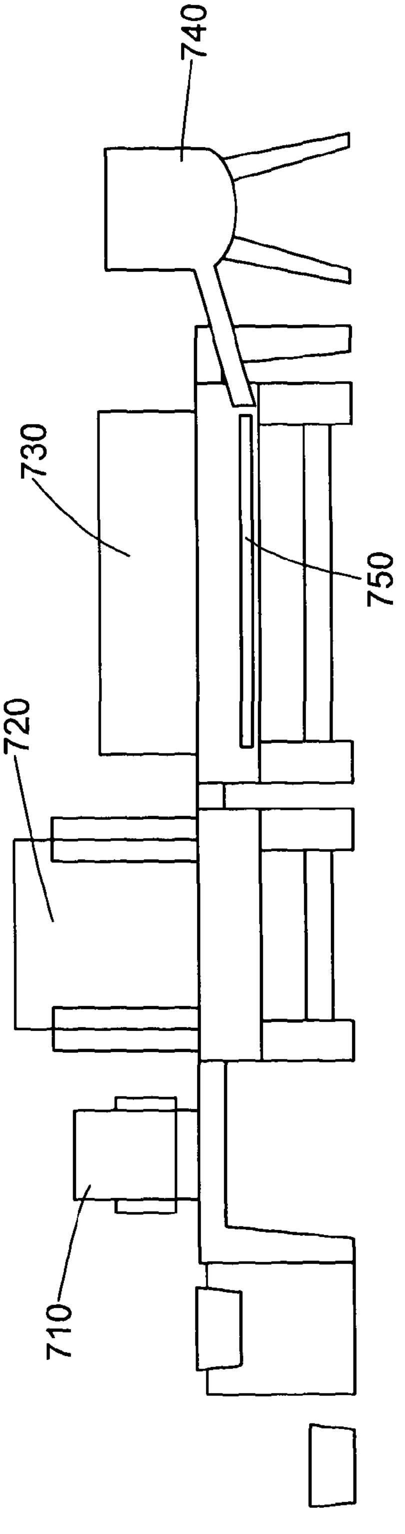
FIG. 14 is an expanded flow diagram of Step 4 of FIG. 9.

FIG. 12 is an expanded flow diagram of Step 3 of FIG. 9, and shows the card finishing process at the card finishing station 600 in more detail. FIG. 13 is a top view of a card produced at the card finishing station 600. The card finishing station 600 applies three further materials to the card 102: a hydrophobic mesh 140 (as per the pre-formed cover tape comprising Layers 1-7 of FIG. 2), a covering tape 105 (as per the top layer of hydrophilic film 6 of FIG. 2), and RFID tags 150 (radio-frequency identification strips). FIG. 13 also shows the registration points 103 spaced at regular intervals on the card 102. In Step 3 a card 102 from Step 2 is transferred to a machine bed of the card finishing station 600. In an embodiment which incorporates the mesh 140, the card 102 is conveyed to a mesh-laying unit 610 with a card vision and position system 612. The vision system 612 establishes the precise location of the card 102. The card position system corrects the position of the card relative to the mesh-laying unit 610. The unit 610 places mesh ribbons 140 across the strips 100. A single mesh ribbon 140 is laid along a single row of strips 100 and adhered thereto by virtue of the double-sided adhesive layer attached to the mesh material (see FIG. 2). The mesh ribbons are anchored by ultrasonic welding before they are cut from feed rolls of the mesh ribbon 140. The card 102 is then taken along the machine bed to a hotmelt pattern laying unit 620, where another vision system 622 pinpoints the location of the card before a hotmelt application head moves across the card 102. The card is then conveyed to a covering tape-laying unit 630. Lanes of covering tape 105 are positioned above the mesh ribbons 140 on top of the double-sided adhesive layer on top of the mesh material (see FIG. 2). Another vision system 632 controls roll out of the covering tape 105 so as to correctly align a hole in the tape 105 with the loading port 110 and sample zone 120 of each strip 100. Downward pressure and heat is then applied to secure the covering tapes 105 before they are cut from their respective feed rolls. The card is then conveyed to an RFID ribbon-laying unit 640, where a vision system 642 again controls the positioning of the RFID ribbon 150 and again corrects the card position with a position system before downward pressure is applied to secure the RFID ribbon 150. The RFID ribbon 150 is self-adhesive and is placed near to the terminal contacts 136 at an end of the strip 100 which is connectable to the measurement device 200. Once the RFID ribbons 150 are cut from their feed rolls to leave RFID tags 150 on each strip 100, the card 102 then proceeds to a third card collector 650. At this stage the performance band of the batch of test strips is determined by destructively testing 1% of all finished cards 102 in a testing unit 660 (FIG. 12*a*). The testing unit applies a precisely dosed glucose solution to each well 122 of a strip 100 taken from a card 102, and takes measurements to obtain a card's 102 performance profile data. This data is uploaded to a production control database and stored as part of a batch record. The data is then recalled in Step 4 (see below). The mesh ribbons 140 are positioned with an accuracy of +/−200 micrometers or better, relative to the registration points on the card 102. The hotmelt pattern is positioned with an accuracy of +/−200 micrometers. The covering tape is positioned with an accuracy of +/−100 micrometers, as is the positioning of the hole in the tape relative to the loading port 110. The RFID ribbons are positioned with an accuracy of +/−200 micrometers.

FIG. 13 is an expanded flow diagram of Step 4 of FIG. 9, and shows the strip cutting and vialing process at the strip cutting and vialing station 700 in more detail. A finished card 102 is transferred from Step 3 to an input track of the station 700. The card is first taken to an RFID programming unit 710, where each of the RFID tags 150 associated with each strip is programmed by retrieving the performance profile data obtained in Step 3 from the batch record database. The data is imparted to the RFID tags 150 to be later read by the measurement device 200 when a patient inserts a strip 100 thereinto. The programmed card 102 is then taken to a row-cutting unit 720 where each card 102 is divided into 8 separate rows along the perforations. Such perforations help the accuracy of cutting, and therefore reduce the space needed between rows, thereby increasing the number of sampling plates per square meter. Wear and tear of the cutter is also reduced. Each card 102 has a waste area at either end. This waste area is removed as part of the row-cutting process and the waste is collected for disposal. The separated rows are collected and transferred to a strip cutting unit 730 where lasers (or alternatively knives) are used to convert each row into 25 individual strips 100. Each row has an area of waste material at each end, which is suitably removed and disposed of at the strip cutting unit 730. Closed vials are then introduced to the cutting and vialing station 700 via a vial hopper 740. Vials are transferred and orientated before being presented for filling. A filling system 750 opens each vial and places up to 25 strips therein before closing the vial. The vials of strips are stored until distribution requests are received. At this point the vials are retrieved and packaged with all necessary labelling, user guides, information, particularly information on performance bands. The strips are then ready for distribution. Row cutting is carried out with an accuracy of +/−100 micrometers. Strip cutting is carried out with an accuracy of +/−100 micrometers.

The original continuous roll 101 is made of paper-based material (i.e. card). In this example the card is coated with a lacquer. Alternatively, however, the roll 101 could be of polymer based materials, such as PVC or polycarbonate.

COMPARATIVE EXAMPLES

Two different sampling plates 1 were made (as per FIGS. 1, 1*a*, and 2) and tested in terms of their respective ability receive and uniformly spread a blood sample throughout the testing zones 22 and handle excess blood.

Example 1

A sampling plate 1 was constructed from a base plate 2 and a multi-layered cover tape 3,4,5 (with the top hydrophilic covering tape 6 missing to allow for dynamic visual examination) where the cover tape 3,4,5 was pre-formed as a finished component before being adhered to the base plate 2.

The cover tape 3,4,5 was formed by first sandwiching a hydrophobic mesh layer 4 (of Sefar 07-120 34 woven polyester) between two double-sided adhesive tapes 3, 5 to form a double-sided adhesive mesh 3,4,5. Each double-sided adhesive tape 3,5 consists of a piece of polyester having its entire surface coated with 10 g/$m^2$ of adhesive on their respective surfaces. A sample zone-shaped hole 20 and an overflow channel/reservoir-shaped hole 26*a*, 26 was then cut out of the double-sided adhesive mesh 3,4,5. A liner was removed from the bottom double-sided adhesive tape 3 and the revealed adhesive surface was adhered to the base plate 2 such that the centre of the cut-out sample zone 20 region coincided with a raised hydrophobic loading platform 12 upon the base plate 2.

A 30 μl blood sample was loaded to the sample zone 20 via the hydrophobic loading platform 12. The blood sample was observed to first spread very rapidly throughout the sample zone 20 and into all four of the testing zones 22 so that each sub-sample was in no way connected to any other sub-sample in the sample zone 20. Once the testing zones were full, excess blood (~20 μl) started to funnel through the overflow channel 26*a* into the overflow reservoir 26. The rate of passage into the overflow reservoir 26 increased dramatically once the first portion of excess blood sample had fully entered the widening part of the overflow reservoir 36. After all the excess blood sample had been drawn into the overflow reservoir 26 the movement of blood ceased. Spreading of the blood sample was entirely uniform throughout the sample zone 20, no air pockets were formed, the blood samples contained within each testing zone 22 were completely discrete, and the hydrophobic loading platform 12 had no blood thereupon.

Example 2

A sampling plate 1 was constructed from a base plate 2 and a multi-layered cover tape 3,4,5 (with the top hydrophilic covering tape 6 missing to allow for dynamic visual examination) where the cover tape 3,4,5 was pre-formed as a finished component before being adhered to the base plate 2.

The cover tape 3,4,5 was formed by first sandwiching a hydrophobic mesh layer 4 (of Sefar 07-120 34 woven polyester) between two double-sided adhesive tapes 3, 5 to form a double-sided adhesive mesh 3,4,5. Each double-sided adhesive tape 3,5 consists of a piece of polyester having its entire surface coated with 10 g/m$^2$ of adhesive on their respective surfaces. A sample zone-shaped hole 20 was then cut out of the double-sided adhesive mesh 3,4,5—this time there was no overflow channel/reservoir-shaped hole and thus no overflow reservoir could be formed within the sampling plate 1. A liner was removed from the bottom double-sided adhesive tape 3 and the revealed adhesive surface was adhered to the base plate 2 such that the centre of the cut-out sample zone 20 region coincided with a raised hydrophobic loading platform 12 upon the base plate 2.

A 30 μl blood sample was loaded to the sample zone 20 via the hydrophobic loading platform 12. The blood sample was observed to first spread quite rapidly throughout the sample zone 20 (although not as rapidly as in Example 1) and into all four of the testing zones 22 without leaving air pockets. Once the testing zones were full, excess blood (~20 μl) remained piled on top of the hydrophobic loading platform 12 to such an extent that the excess blood linked the samples in the testing zones 22 so that they were not discrete.

Therefore, an overflow reservoir is clearly desirable to accommodate excess blood sample but is, furthermore, advantageous in that it helps to rapidly and uniformly spread the blood sample in the sample zone 20 by virtue of the air venting effect.

The invention claimed is:

1. A sampling plate, comprising:

a sample zone for receiving a liquid sample;

an air porous body which is in fluid communication with the sample zone, the air porous body being arranged to receive air displaced from the sample zone as the liquid sample is received into the sample zone;

an overflow reservoir linked to the sample zone via an overflow channel;

a loading port for loading the liquid sample; and a loading path between the loading port and sample zone along which the liquid sample can travel towards the sample zone;

wherein the sample zone comprises:

at least two discrete testing zones, each defined by a well, having a hydrophobic boundary lying between the at least two testing zones; and a raised hydrophobic loading platform located towards a central region lying between all the respective testing zones, the loading platform being arranged to first receive the liquid sample before distributing the liquid sample amongst the respective testing zones;

wherein each testing zone comprises:

a hydrophilic portion; and a pair of electrodes which is bridged, in use, by the liquid sample in a testing zone;

wherein the overflow channel is linked to the hydrophobic loading platform to enable the liquid sample to flow from the hydrophobic loading platform into the overflow reservoir;

wherein the overflow channel is discrete from the at least two discrete testing zones, and separated therefrom by a hydrophobic boundary; and wherein the overflow channel is narrower than each respective entrance to the testing zones.

2. The sampling plate as claimed in claim 1, wherein the overflow reservoir is auxiliary to the testing zones.

3. The sampling plate as claimed in claim 2, wherein the overflow reservoir has a volume capacity exceeding the volume capacity of a single testing zone.

4. The sampling plate as claimed in claim 3, wherein the overflow reservoir has a volume capacity exceeding the total volume capacity of all the testing zones of the sample zone.

5. The sampling plate as claimed in claim 1, wherein the sample zone comprises a distribution center arranged to distribute the liquid sample to the testing zone(s), wherein the overflow channel is linked to the distribution center to enable the liquid sample to flow from the distribution center into the overflow reservoir.

6. The sampling plate as claimed in claim 1, wherein the overflow reservoir is a well.

7. The sampling plate as claimed in claim 1, wherein the overflow channel is arranged to restrict flow of the liquid sample into the overflow reservoir to a greater extent than flow is restricted into the testing zone(s).

8. The sampling plate as claimed in claim 1, wherein the overflow channel widens towards the overflow reservoir.

9. The sampling plate as claimed in claim 1, wherein the air porous body is in fluid communication with the overflow reservoir.

* * * * *